(12) United States Patent
Tosaya

(10) Patent No.: US 6,731,270 B2
(45) Date of Patent: *May 4, 2004

(54) PIEZOELECTRIC TRANSDUCER FOR DATA ENTRY DEVICE

(75) Inventor: Carol A. Tosaya, Los Altos, CA (US)

(73) Assignee: Luidia Inc., San Carlos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,429

(22) Filed: Oct. 21, 1998

(65) Prior Publication Data

US 2001/0012002 A1 Aug. 9, 2001

(51) Int. Cl.⁷ .................................. G09G 5/00
(52) U.S. Cl. ....................... 345/173; 345/177; 345/179; 345/175; 345/176; 178/18.06; 178/18.07; 178/18.01; 178/18.02; 178/18.03; 178/18.04; 178/18.05; 178/19.01; 178/19.02; 178/19.03; 178/19.04; 178/19.05; 178/19.06
(58) Field of Search .................. 345/179, 177, 345/173, 175, 176; 178/19.01, 19.02, 19.03, 19.04, 19.05, 19.06, 18.01, 18.02, 18.03, 18.04, 18.05, 18.06, 18.07

(56) References Cited

U.S. PATENT DOCUMENTS

| | | | |
|---|---|---|---|
| 3,838,212 A | 9/1974 | Whetstone et al. | 179/18 |
| 4,012,588 A | 3/1977 | Davis et al. | 178/18 |
| 4,246,439 A | 1/1981 | Romein | 178/18 |
| 4,513,437 A | 4/1985 | Chainer et al. | 382/3 |
| 4,654,648 A * | 3/1987 | Herrington et al. | 340/710 |
| 4,697,050 A | 9/1987 | Farel et al. | |
| 4,758,691 A | 7/1988 | De Bruyne | 178/19 |
| 4,814,552 A | 3/1989 | Stefik et al. | 178/18 |
| 4,862,152 A | 8/1989 | Milner | 340/712 |

(List continued on next page.)

FOREIGN PATENT DOCUMENTS

EP 0 615 209 A 9/1994

OTHER PUBLICATIONS

Brenner and de Bruyne, *A Sonic Pen: A Digital Stylus System*, Jun. 1970, IEEE Transactions on Computers.

Lawrence Roberts, *The Lincoln Wand*, 1966, Lincoln Laboratory.

Primary Examiner—Richard Hjerpe
Assistant Examiner—Jean Lesperance
(74) Attorney, Agent, or Firm—Dov Rosenfeld Inventek

(57) ABSTRACT

A piezoelectric transducer is provided, in which a piezoelectric shell has conductive layers on the outside and inside of the shell, which are adapted to be connected to a signal input source. When the conductive layers are activated, the piezoelectric layer resonates to produce an output signal waveform from the shell structure. An alternative embodiment includes a flat piezoelectric layer with opposing conductive layers, which is then formed into a shell structure. In preferred embodiments, an inner spool is located within the shell structure, which acts to increase the output sound pressure level for the transducer. To increase the sound pressure level further, the inner spool preferably includes a recessed area, which defines a void between the inner conductive layer on the shell and the recessed area. The void acts to increase the characteristic output sound pressure level for the transducer. In some embodiments, the piezoelectric transducer is placed into a data entry device, such as a transmitter pen, and is used to transmit a signal from the pen to one or more receivers, which can be used to accurately determine the location of the pen, in relation to an electronic tablet or white board. The transmitter pen preferably includes a writing pen, wherein the writing tip extends through the shell structure of the piezoelectric transducer.

77 Claims, 14 Drawing Sheets

U.S. PATENT DOCUMENTS

| | | |
|---|---|---|
| 4,891,474 A | 1/1990 | Kelly .......................... 178/18 |
| 4,991,148 A | 2/1991 | Gilchrist ..................... 367/124 |
| 5,215,397 A | 6/1993 | Taguchi et al. |
| 5,239,139 A | 8/1993 | Zuta ........................... 178/18 |
| 5,248,856 A | 9/1993 | Mallicoat ..................... 178/18 |
| 5,280,457 A | 1/1994 | Figueroa et al. ............ 367/127 |
| 5,308,936 A | 5/1994 | Biggs et al. ................. 178/18 |
| 5,379,269 A | 1/1995 | Sindeband et al. ......... 367/127 |
| 5,488,204 A * | 1/1996 | Mead et al. .................. 178/18 |
| 5,750,941 A * | 5/1998 | Ishikawa et al. ............. 178/19 |
| 5,981,883 A * | 11/1999 | Shriver .................... 178/18.01 |
| 6,002,387 A * | 12/1999 | Ronkka et al. ............. 345/157 |
| 6,335,723 B1 * | 1/2002 | Wood et al. ................ 345/173 |
| 6,414,673 B1 * | 7/2002 | Wood et al. ................ 345/173 |

* cited by examiner

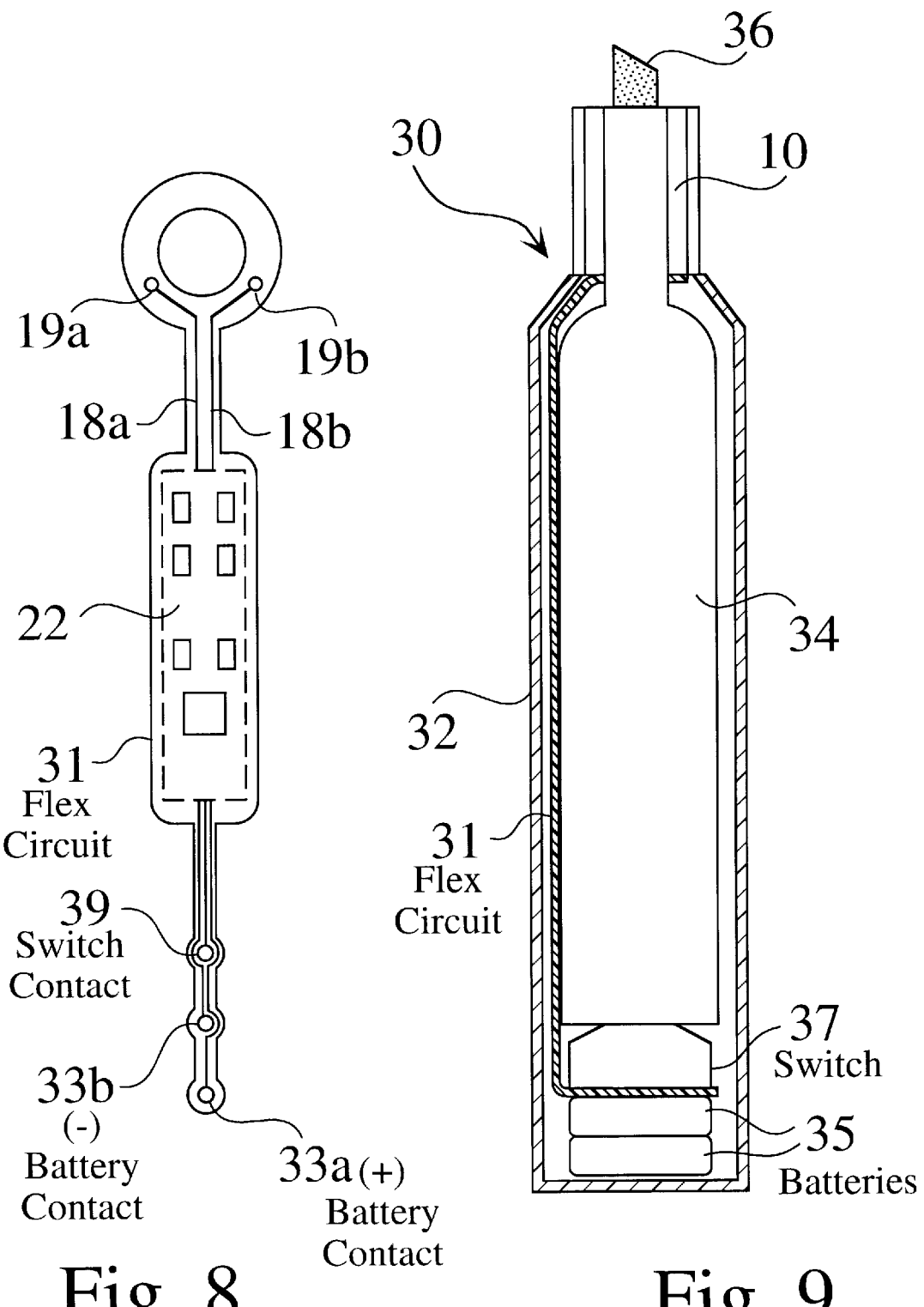

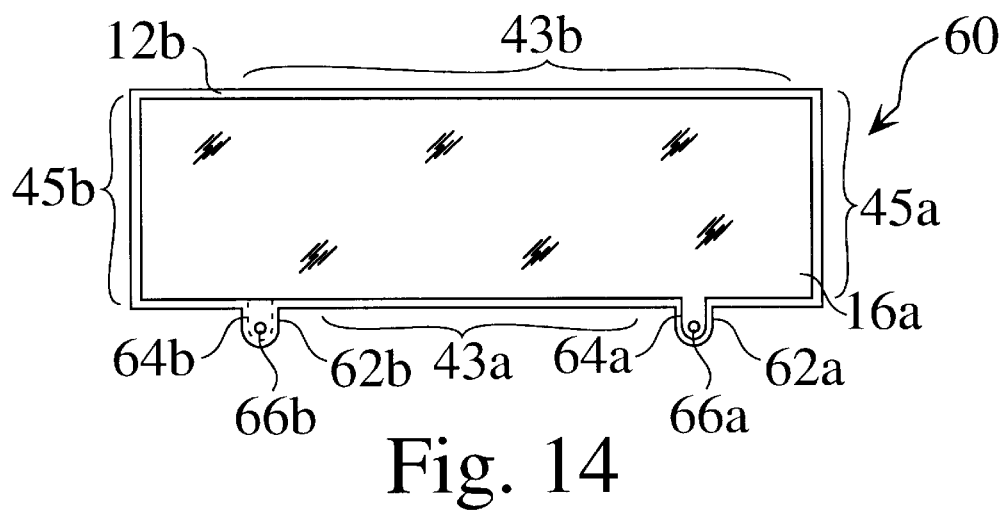
Fig. 14
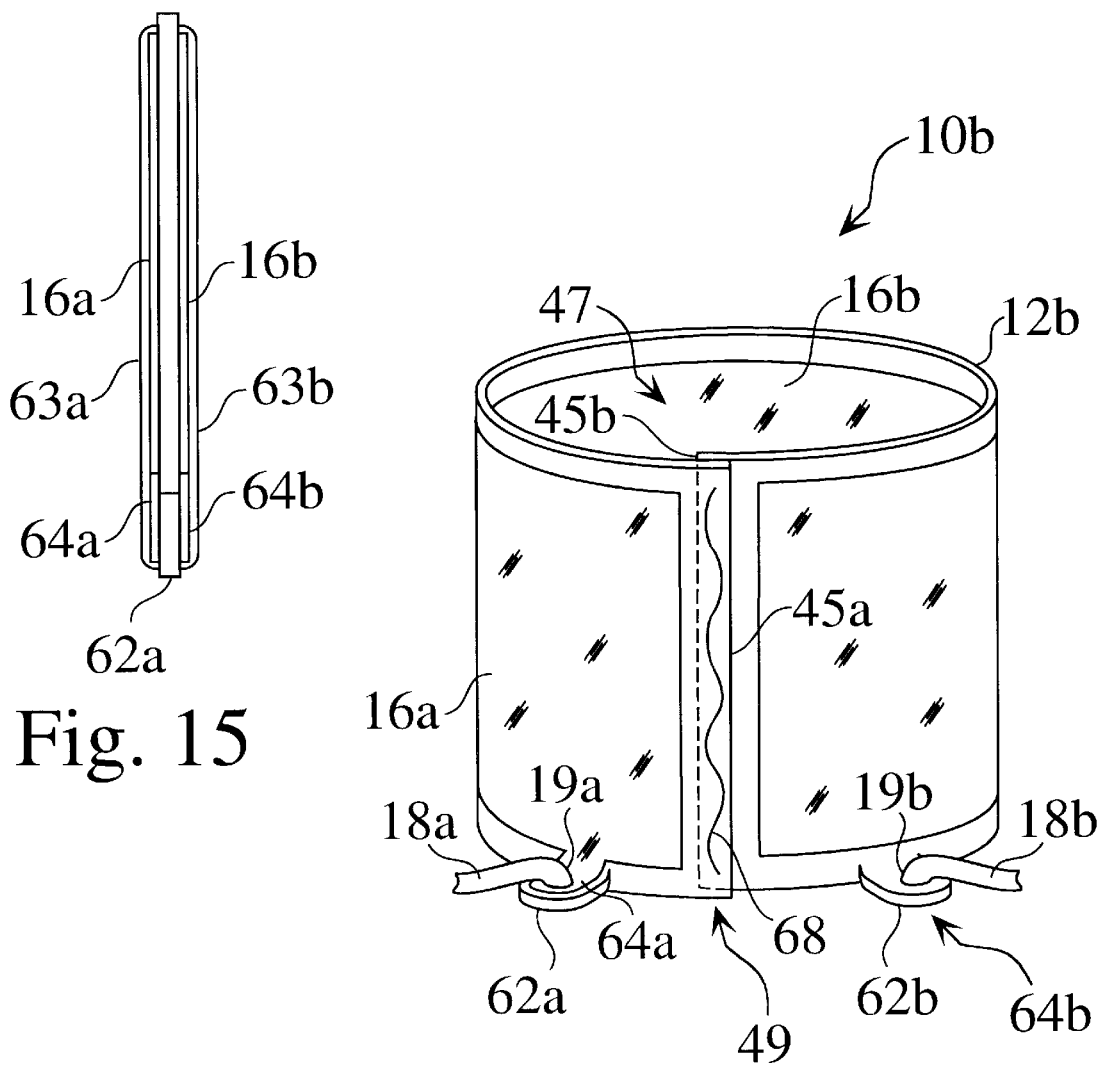
Fig. 15
Fig. 16

PIEZOELECTRIC TRANSDUCER FOR DATA ENTRY DEVICE

FIELD OF THE INVENTION

The invention relates to the field of electromechanical transducers. More particularly, the invention relates to a piezoelectric transducer for a data entry device.

BACKGROUND OF THE INVENTION

Electromechanical transducers are used for a variety of applications, including data entry applications such as digitizing pen-and-tablet systems. Data entry systems typically include a writing area, such as a tablet or white board, a position indicating pen, and associated electronics for determining the interaction between the position-indicating pen and the writing area. A digital data entry signal is typically derived to represent the relative position of the position-indicating pen and the tablet.

Ultrasound-based electronic tablets and whiteboards are based on either through-the-air transmission (air transmission) or through-the-surface-of-the-board (solid transmission) of ultrasonic pulses. The position of a movable data-entry device on the writing surface is calculated, typically by the geometric intersection of travel times of ultrasonic pulses measured between the data-entry device and a plurality of fixed-location sensor stations, which are located on the periphery of the writing area. Full coverage of a writing area, such as a tablet or a whiteboard, typically requires a minimum of two fixed-location sensors, and one movable sensor for geometric triangulation.

The actual number of required sensors depends on the radiation angle of the ultrasound transmitter or transmitters (the transmission directivity), the strength of the transmitted signal, the acceptance angle of the ultrasound receivers (the reception directivity), and the sensitivity of the receivers to the vibrational frequency of the transmitted pulses.

Many prior art tablets or writing surfaces which use pen shaped data-entry devices are based on touch-panel technologies. Typically, complicated grid layers extend across the surface, and are held apart by tension underneath the writing surface. The location of a data-entry device, such as a data-entry pen, is determined by the location at which the pen presses the grid layers together. Ibid™ whiteboard from Microtouch, of Methuen, Mass., the SmartBoard™ from Microfield Graphics, of Calgary, Alberta, Canada, and pen-based digitizing tablets from Wacom Co, Ltd., of Saitama, Japan are examples of touch-panel technology electronic whiteboards.

A drawback of touch-panel prior art tablets and whiteboards is that the writing surface is an integral component of the system. As the size of the writing area increases, their portability, ease of installation, and product cost become increasingly problematic.

S. Sindeband, and T. Stone, *Position Determining Apparatus*, U.S. Pat. No. 5,379,269 (Jan. 3, 1995) disclose an apparatus for determining the position of a movable element over a surface of a solid medium. Sindeband et al. describe an electronic whiteboard system which uses ultrasound to determine the position of a pen-shaped stylus on a writing surface. While Sindeband et al. disclose a movable transmitter, the transmitted ultrasonic energy is required to travel through a solid medium. To obtain a consistent signal through a solid medium, therefore, the transmission characteristics of the solid surface must be uniform.

The establishment of a large homogenous writing structure can be difficult and expensive, and precludes the use of the transmitter pen on a generic surface, such as a white board. Standard white boards are not homogenous structures, typically having a common particle board or Masonite™ composite backing, with an applied top surface that typically has non-uniform surface characteristics.

Therefore, an electronic whiteboard based on the principles of operation disclosed by Sindeband et al. would require that a special whiteboard writing surface be included in the product cost. As well, Sindeband et al. disclose a tethered movable stylus, wherein a transmitter is acoustically coupled to the solid medium, which precludes a writing tip within the stylus.

Despite these drawbacks, prior art grid-based tablets and whiteboards typically include data-entry devices which have the look and feel of a pen, and they are designed to be gripped and used like a pen. The user is not required to orient the data-entry device in any special manner.

Ultrasound-based electronic whiteboards that rely on through-the-air transmission of ultrasound pulses, rather than transmission through the solid medium of the whiteboard, offer the opportunity for a product which excludes a dedicated whiteboard writing surface. As an example of such an implementation, an ultrasound transmitter can be located in the movable, pen-style data-entry device. A fixed-position array of ultrasound receivers is located along the periphery of the writing surface. These sensors are used to triangulate the position of the data-entry device on the surface of the whiteboard. The receivers are typically attached directly to a whiteboard, or are mounted to a frame, which is then attached to a whiteboard or other approximately flat writing surface.

Optimally, a sensor for a pen-shaped data-entry device has a transmission directivity that is omni-directional from the writing tip, thus providing cylindrical symmetry to the transmitted signal, which allows the user to hold the device as any pen would be held, without the need to orient a sensor located on the data-entry device toward other receiving sensors located at the periphery of the writing surface.

In the past, most working examples of omnidirectional ultrasonic transmitters were based on spark-gap designs. L. Roberts, "*The Lincoln Wand*", MIT Lincoln Lab Report, Lexington Mass., June 1966, and P. De Bruyne, "*Compact Large-Area Graphic Digitizer for Personal Computers*", Dec. 1986, pp 49–53, IEEE, disclosed examples of spark-gap data-entry devices for electronic whiteboards.

One significant drawback of spark-gap transmitters is the audible, repeated "snap" sound associated with the generation of ultrasound pulses. Another significant drawback with spark-gap transmitters is high power consumption, which makes untethered battery-powered operation impractical, since batteries must be changed or recharged on a frequent basis.

As well, spark gap transmitters typically have a transmitter tip that resides on the entire pointing tip of the movable device. The mechanism for producing a spark gap signal has to act as a point source, requiring that the end of the transmitter pen is used as an acoustic horn. This hardware configuration prevents the use of a writing tip, such as a standard writing implement or pen cartridge, from being placed within the device, with a writing tip extending from the pointing tip of the device, as such that a user can write upon a surface, such as a white board, while simultaneously sending a position signal from the pointing tip to external receivers.

R. Herrington and K. Burgess, *Wireless Cursor Control System*, U.S. Pat. No. 4,654,648 (Mar. 31, 1987) disclose a "wireless movable steering means which emits acoustic signals". While Herrington et al. disclose a movable transmitter stylus, the spark gap mechanism inherently precludes the use of a writing pen within the pointing tip of the hand-held stylus.

Similarly, A. Whetstone, S. Fine, W. Banks, and S. Phillips, *Graphical Data Device*, U.S. Pat. No. 3,838,212 (Jan. 3, 1995) disclose a graphical data device employing a stylus moving over an area to be digitized and utilizing a fast rise time sound energy shock, generated by a spark at the location of the stylus and propagated though the air.

R. Davis and J. Howells, *Position Determining Apparatus and Transducer Therefor*, U.S. Pat. No. 4,012,588 (Mar. 15, 1977) disclose an apparatus for determining the position of a movable element, wherein "each receiver comprises a hollow shell of piezoelectric material, which may be cylindrical or spherical in shape, and resilient conductive means coupled across the inner and outer surface of the shell". While Davis et al. disclose a cylindrical symmetry for a complicated, stationary, piezoelectric receiver, they fail to disclose the use of a piezoelectric transmitter having cylindrical symmetry within a movable data entry device. In addition, the inner volume of the disclosed cylindrical receiver is filled with a complicated, conductive resilient filling.

S. Mallicoat, *Code-Based Electromagnetic-Field-Responsive Graphic Data-Acquisition System*, U.S. Pat. No. 5,248,856 (Sep. 28, 1993) discloses an "electromagnetic-field-responsive, code-based, graphic data acquisition system for tracking the operational status of a mobile write-effective component in relation to a defined writing-surface area". While Mallicoat discloses a pen within the data-acquisition system, the pen includes retro-reflecting regions interspersed with substantially non-retroreflecting regions dispersed circumferentially around the pen, whereby the retro-reflecting regions optically intersect a scanning zone, and reflect light from a scanning light beam source towards a monitoring structure.

M. Biggs, T. O'Ishi, and M. Knighton, *Ultrasonic Pen-Type Data Input Device*, U.S. Pat. No. 5,308,936 (May 3, 1994) disclose a movable transmitter pointer which simultaneously emits magnetic pulses and ultrasonic pulses. While Biggs et al. disclose an ultrasonic transducer within a movable pointer, the transducer is comprised of a "piezo stack", which is coupled to a complex aluminum diaphragm and a brass reaction mass, which occupies the entire pointing tip of the movable transmitter pointer. The disclosed stylus therefore has an inherent disadvantage of spark gap pointer designs, in that the hardware occupies a large volume of the pointer, and precludes the use of a writing tip within the pointer.

P. De Bruyne, *Apparatus for Determining the Position of a Movable Object*, U.S. Pat. No. 4,758,691 (Jul. 19, 1988) discloses an apparatus which contains "two fixed ultrasound transmitters, an ultrasound receiver forming part of a movable object, and a calculator". De Bruyne discloses a movable ultrasound receiver transducer which consists of a cylindrical condenser having an air gap with one solid and one movable electrode. The disclosed copper foil electrode does not cover the whole circumference of the cylindrical condenser, and results in an effective range of about 210 degrees.

I. Gilchrist, *Acoustic Digitizing System*, U.S. Pat. No. 4,991,148 (Feb. 5, 1991) discloses an acoustic sensing apparatus which contains "an acoustic point source transmission device mounted on an indicator for transmitting a sequence of periodic acoustic oscillations". The disclosed acoustic point source can be configured as a linear stylus, which includes at least a pair of directional acoustic transmitters located away from the pointing tip of the stylus. For two-dimensional position detection, the apparatus employs "at least three acoustic receivers arranged in a non-linear fashion".

M. Stefik and C Heater, *Ultrasound Position Input Device*, U.S. Pat. No. 4,814,552 (Mar. 21, 1989) discloses an "input device, or stylus, for entering hand drawn forms into a computer using a writing instrument, a pressure switch for determining whether the instrument is in contact with the writing surface, an acoustic transmitter for triangulating the position of the stylus on the surface, and a wireless transmitter for transmitting data and timing information to the computer. In operation, the stylus transmits an infrared signal which the system receives immediately, and an ultrasound pulse which two microphones receive after a delay which is a function of the speed of sound and the distance of the stylus from the microphone". While Stefik et al. discloses a stylus having a cylindrical enclosure that contains a felt tip marker, and an ultrasonic transducer located near the marker tip, the disclosed transducer is a directional, can-style transmitter, Part No. 40S2 from Murata, Inc., which has a directivity of not more than 120 degrees. The limited directivity requires that the user must consistently orient the stylus towards the fixed-position receivers located at the periphery of the writing surface, such that the receivers are spaced closely enough such that at least two receivers are always within the 120 degree transmission zone for triangulation of the position of the stylus. If the transmitter stylus is positioned close to any receiver, such as occurs when the receivers are located along the periphery of a whiteboard writing surface, the limited directivity requires a large number of receivers.

J. Romein, *Acoustic Writing Combination, Comprising a Stylus With a Writing Tablet*, U.S. Pat. No. 4,246,439 (Jan. 20, 1981) discloses an acoustic writing combination which contains a stylus which is "provided with two ultrasonic sources" which emit pulse-shaped sound signals. The disclosed sound sources are point shaped or circular shaped, which may comprise piezo-electric ceramic rings. While Romein discloses the use of cylindrical piezo-electric rings, the stylus requires two rings to properly locate the pointing tip of the stylus, and does not include a writing tip at the pointing tip of the stylus.

R. Milner, *Acoustic Sonic Positioning Device*, U.S. Pat. No. 4,862,152 (Aug. 29, 1989) discloses a three-dimensional position control device suitable for controlling computer displays or robot movements, wherein "signals from an ultrasonic transmitter are received by multiple receivers".

R. Garwin, J. Levine, and M. Schappert, *Acoustic Contact Sensor for Handwritten Computer Input*, U.S. Pat. No. 4,845,684 (Jul. 4, 1989) discloses an acoustic contact sensor for handwritten input, which includes an ultrasonic sending transducer means.

M. Zuta, *Ultrasonic Digitizer Pen Having Integrated Ultrasonic Transmitter and Receiver*, U.S. Pat. No. 5,239,139 (Aug. 24, 1993) discloses an ultrasonic digitizer pen which includes an ultrasonic transmitter "to transmit ultrasonic waves through the air, to illuminate a writing surface". While Zuta discloses discrete piezoelectric layers, the transmitted signal cones from each of the segments do not overlap.

It would be advantageous to provide a transmitter adapted to a movable transmitter pen which allows a user to use the transmitter pen as a standard white board pen, the way a pen normally would be used, wherein the user can write upon a writing surface at any incline angle, and without the necessity to orient the transmitter in the pen toward the receivers located along the periphery of the writing surface, while a transmitted signal between the transmitter pen and external receivers simultaneously provides full capture of everything that is written upon the writing surface.

Small, directional ultrasound transducers that could be fitted near the tip of a hand held, pen-style data entry device are manufactured commercially, and include components such as MA40A3, manufactured by Murata Manufacturing Co. Ltd., Kyoto, Japan. These devices house a small, thin disc of piezoelectric ceramic material, and are limited to a transmission angle of between 100 and 120 degrees. In order to achieve a 360-degree ultrasound transmission pattern, a minimum of three to four transducers must be mounted surrounding the tip of the data-entry device. However, each transducer is 1 centimeter in diameter and approximately 1 centimeter in length. Four such devices, when mounted to surround the tip of a pen, must be protected from obstruction by fingers and or other objects that block the ultrasound path between the transmitter and receiver sensors. This may be an impractical, bulky data-entry device.

The disclosed prior art transducers thus provide basic transmission signals for a movable device, but fail to provide a transducer that can transmit an output signal in a radial manner, such as outwardly from the tip of a data entry pen, which can be received by remote receivers along the periphery of a writing area, such as a white board, while providing access for a writing implement. As well, the disclosed prior art transducers fail to provide a transducer which can transmit an output signal to one or more remote receivers when the transmitter and pen are inclined relative to a writing area. Furthermore, the disclosed omnidirectional prior art transducers fail to demonstrate that the power requirement is low enough to enable wireless, battery powered operation of a data entry device, such as a transmitter pen. The development of such a piezoelectric transducer would constitute a major technological advance.

SUMMARY OF THE INVENTION

A piezoelectric transducer is provided, in which a piezoelectric cylindrical shell has conductive layers on the outside and inside of the shell, which are adapted to be connected to a signal input source. When the conductive layers are activated by the signal input source, the piezoelectric layer resonates to produce an output signal waveform, typically having a characteristic sound pressure level, from the shell structure. Alternative embodiments include a flat piezoelectric layer with opposing conductive layers, which is then formed into a shell structure. In a preferred embodiment, an inner spool is located within the shell structure, which acts to increase the output sound pressure level for the transducer. To increase the sound pressure level further, the inner spool preferably includes a recessed area, which defines a void between the inner conductive layer on the shell and the recessed area. The void acts to increase the characteristic output sound pressure level for the transducer. In one embodiment, the piezoelectric transducer is placed in a data entry device, such as a transmitter pen, and is used to transmit a signal from the pen to a receiver, which can be used to accurately determine the location of the pointing tip of the pen, in relation to an electronic tablet or white board.

BRIEF DESCRIPTION OF THE DRAWINGS

FIG. 8 is a front view of a flexible circuit assembly which can be used in a preferred embodiment of the transmitter pen;

FIG. 9 is a partial cutaway view of a preferred transmitter pen, which includes a flexible circuit assembly and a pressure-sensitive activation switch;

FIG. 14 is a front view of a flat piezoelectric assembly having opposing conductive layers and lead attachment extension tabs;

FIG. 15 is a side view of a flat piezoelectric assembly having opposing conductive layers and lead attachment extension tabs;

FIG. 16 is a perspective view of a piezoelectric transducer shell formed from a flat piezoelectric assembly;

DETAILED DESCRIPTION OF PREFERRED EMBODIMENTS

Figure 1:
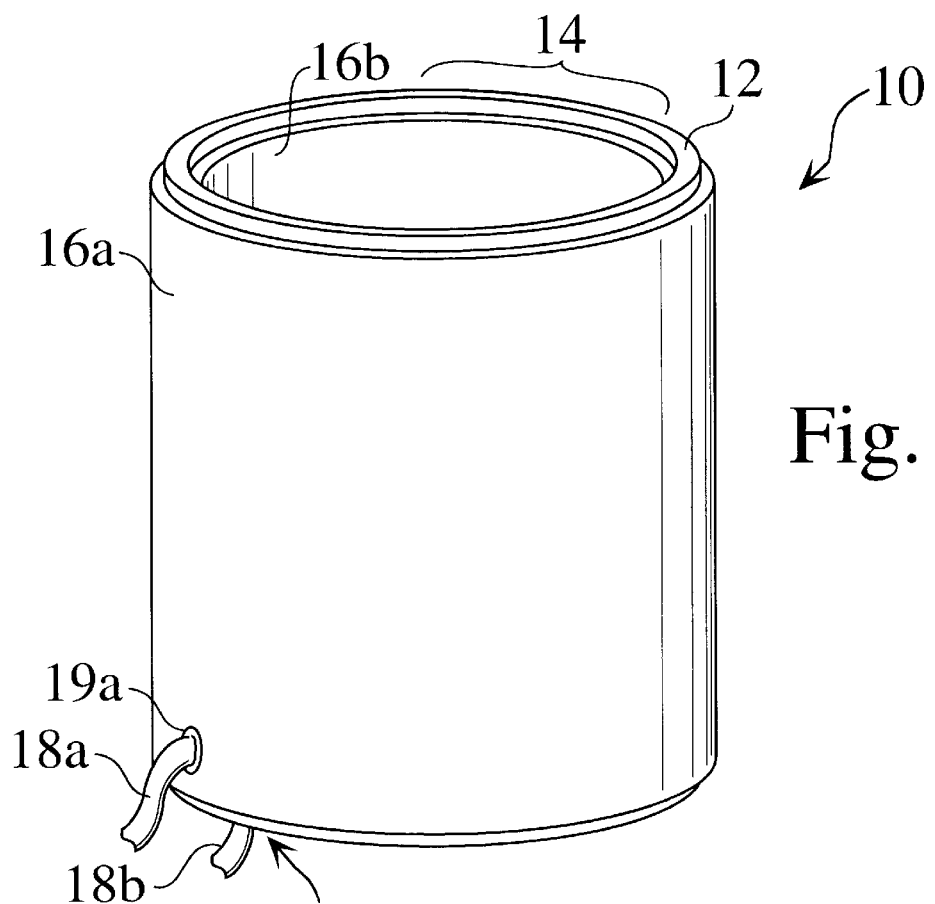
FIG. 1 is a perspective view of a radially transmitting or receiving cylindrical shell piezoelectric transducer.

FIG. 1 is a perspective view of a piezoelectric transducer 10. A piezoelectric layer 12, typically having a cylindrical shape 14, has an outer conductive layer 16a and an inner conductive layer 16b. The outer conductive layer 16a and outer conductive layer 16b are electrodes, which typically are physically or chemical deposited onto the piezoelectric layer 12. In a preferred embodiment, the piezoelectric layer 12 is composed of polyvinylidene difluoride (PVDF) or of copolymers of PVDF. PVDF film is presently available from manufacturers such as Measurement Specialties, Inc., of Fairfield, N.J., and Ktech Corp., of Albuquerque, N.Mex. PVDF is a useful material within the piezoelectric transducer 10, since it is easy to cut and shape, and is relatively unbreakable. As well, PVDF is readily bonded to other materials or to itself.

Figure 5:
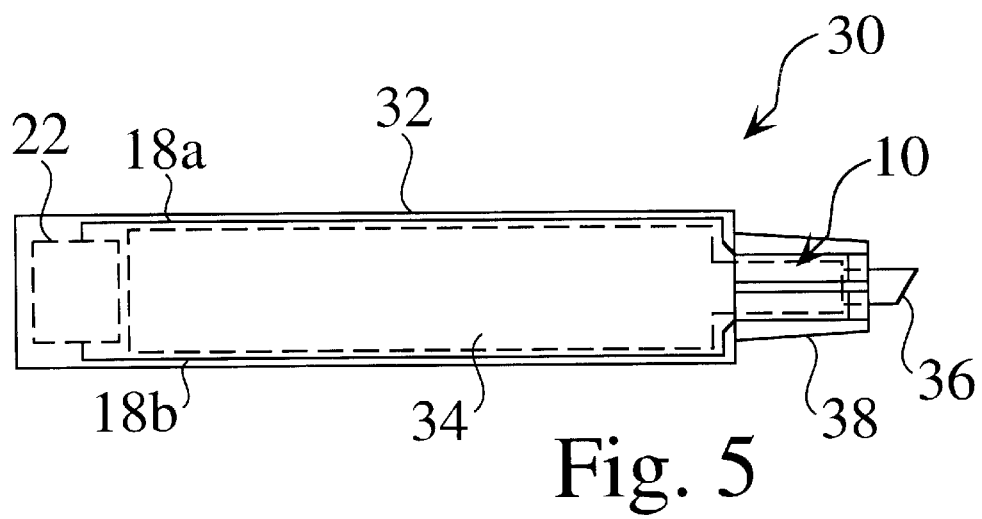
FIG. 5 is a side view of a transmitter pen having a piezoelectric transducer contained near the writing tip of the pen.
Figure 6:
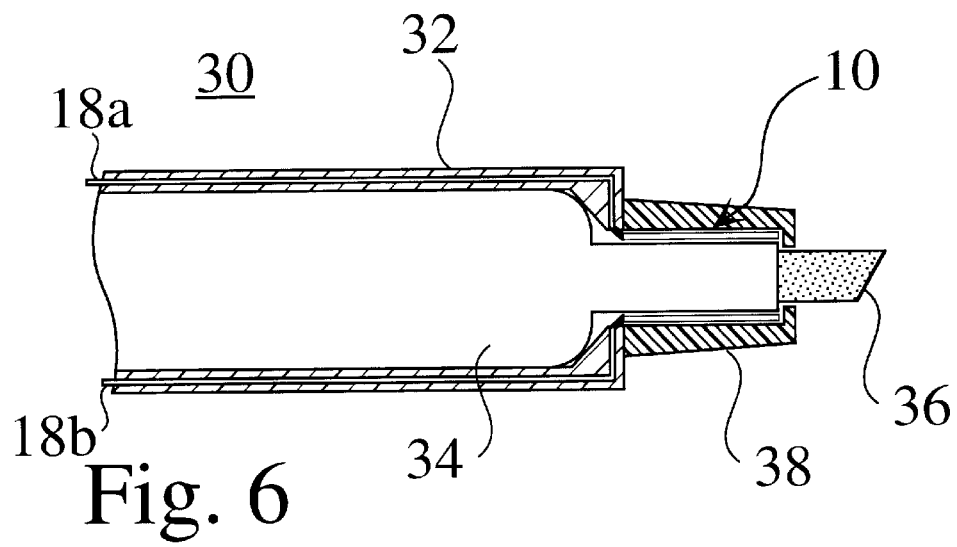
FIG. 6 is a partial cutaway view of a transmitter pen having a piezoelectric transducer contained near the writing tip of the pen.

In an alternate embodiment, piezoelectric ceramic may be custom-fabricated in the form of a cylindrical-shell transducer 10 that can surround the tip of a marker pen 34 (FIGS. 5, 6). Fabrication of piezoelectric ceramics is presently available through either Murata Manufacturing Co. Ltd., or the Piezoelectronics Division of Motorola, Inc., of Albuquerque, N.Mex. However, cylindrically shaped, bare piezoelectric ceramic elements 12 are typically expensive to manufacture, and are brittle and fragile. Therefore, cylindrically shaped, bare piezoelectric ceramic elements 12 are difficult to use in a hand-held data entry device.

As shown in FIG. 1, first signal lead 18a is attached to the outer conductive layer 16a by lead connection 19a, and a second signal lead 18b is attached to the inner conductive layer 16b by lead connection 19b. The lead connections 19a and 19b are typically achieved either by conductive polymers, ultrasonic welds, low temperature solder, heat stakes, rivets, brads, or eyelets.

Figure 2:
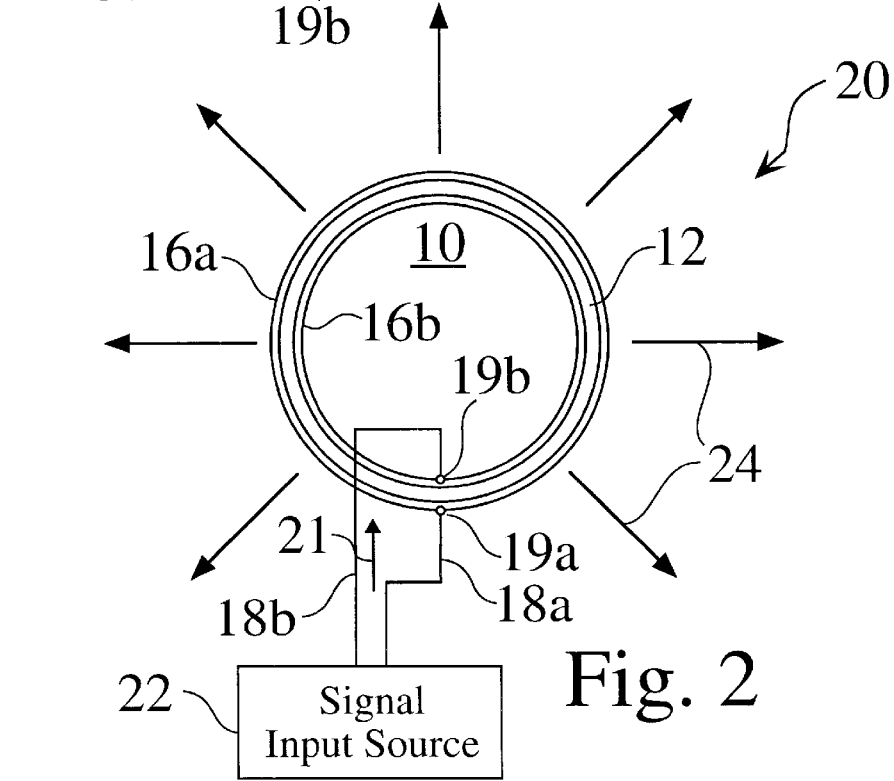
FIG. 2 is a detailed top view of a cylindrical piezoelectric transducer, which shows an output signal transmitted from the transducer when the conductive electrode layers are activated by an input signal.

The signal leads 18a, 18b are adapted to be connected to a signal input source 22, as shown in FIG. 2. When the conductive layers 16a, 16b are activated by an applied voltage 21 from the signal input source 22, the piezoelectric layer resonates to produce an output signal waveform 24 (FIG. 3), typically having a characteristic sound pressure level 56 (FIGS. 12, 13), from the shell structure 10.

An outer protective coating 63 (FIG. 15), such as a thin coating of a polymer or resin, may be used to protect the conductive layers 16, to prevent abrasion, tarnishing or discoloration of the conductive layers 16. However, for many embodiments, the application of a protective coating 63 is expensive, and the combined thickness of the electrode 16 and protective coating 63 may be hard to control, which can produce undesirable variation in the resonant frequency or sound pressure level output of the piezoelectric layer 12.

In some preferred embodiments, the electrically conductive surface layers 16 are made of silver, a silver-based compound or alloy, gold, or a gold-based compound or alloy. The preferred conductive layer electrodes 16a, 16b comprise a mixture of carbon and silver, which eliminates visible tarnishing or discoloration. The preferred method of forming the conductive electrode layers 16 is by silk screen or by vacuum deposition. When used with a finger guard 38 (FIGS. 5–7), the use of the preferred carbon-silver layer 16 reduces the manufacturing costs for the piezoelectric transducer 10, and provides better control of the finished thickness, thereby reducing variation in the resonant frequency of the piezoelectric transducer 10.

Figure 17:
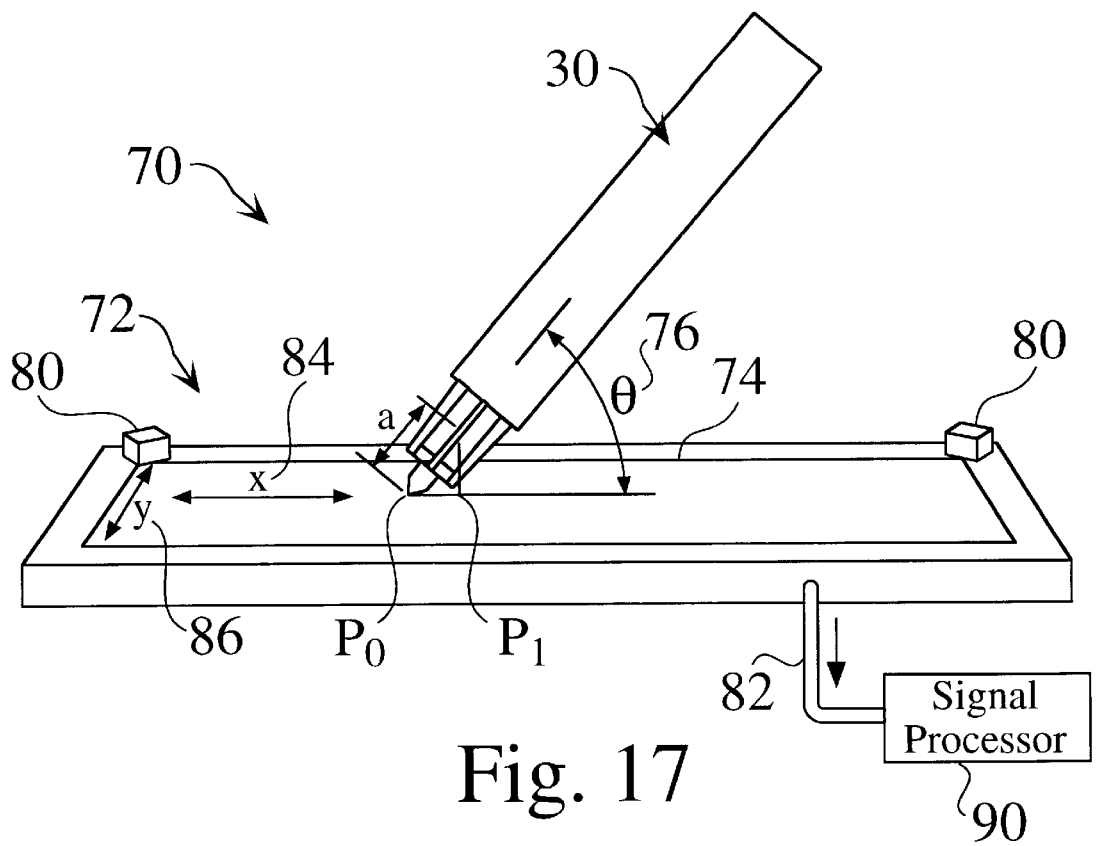
FIG. 17 is a perspective view of a piezoelectric transmitter pen inclined against a writing surface.

FIG. 2 is a detailed top view 20 of the cylindrical piezoelectric transducer 10 shown in FIG. 1. An output signal 24 is transmitted from the transducer 10 when the conductive layers 16a, 16b are activated by an input signal 21 from a signal input source 22 through signal leads 18a, 18b. The generally cylindrical shape 14 of the piezoelectric transducer 10 allows the output signal 24 to be transmitted radially outward from the piezoelectric transducer 10, so that the output signal 24 can be received at a number of remote receivers 80 (FIG. 17).

Figure 3:
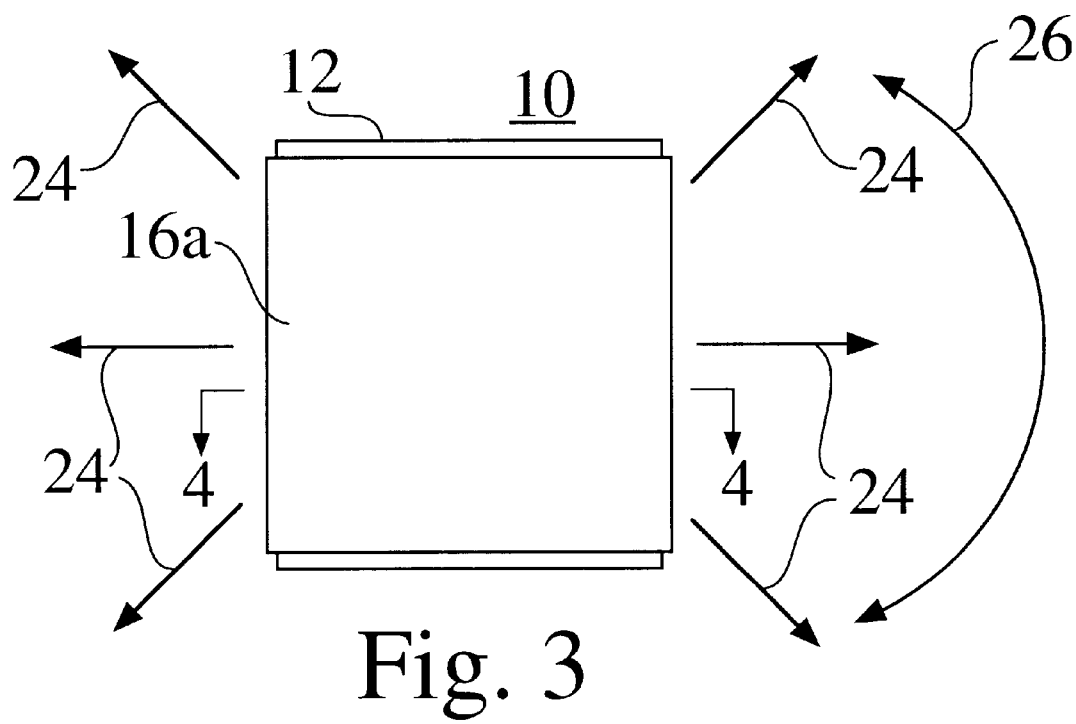
FIG. 3 is a detailed side view of a piezoelectric transducer, which shows an output signal to be transmitted from the transducer when the conductive layers are activated by an input signal.

FIG. 3 is a detailed side view of the piezoelectric transducer 10, which shows an output signal 24 transmitted from the transducer 10 when the conductive layers 16a, 16b are activated by an input signal 21. In addition to the radial nature of the output signal 24 from the piezoelectric transducer 10, the output signal 24 waveform typically spans a transmission angle 26 across the length of the piezoelectric transducer 10, providing significant vertical broadening of the transmission directivity. The vertical directivity angle 26 becomes larger as the height of the cylinder 12 becomes smaller.

Figure 4:
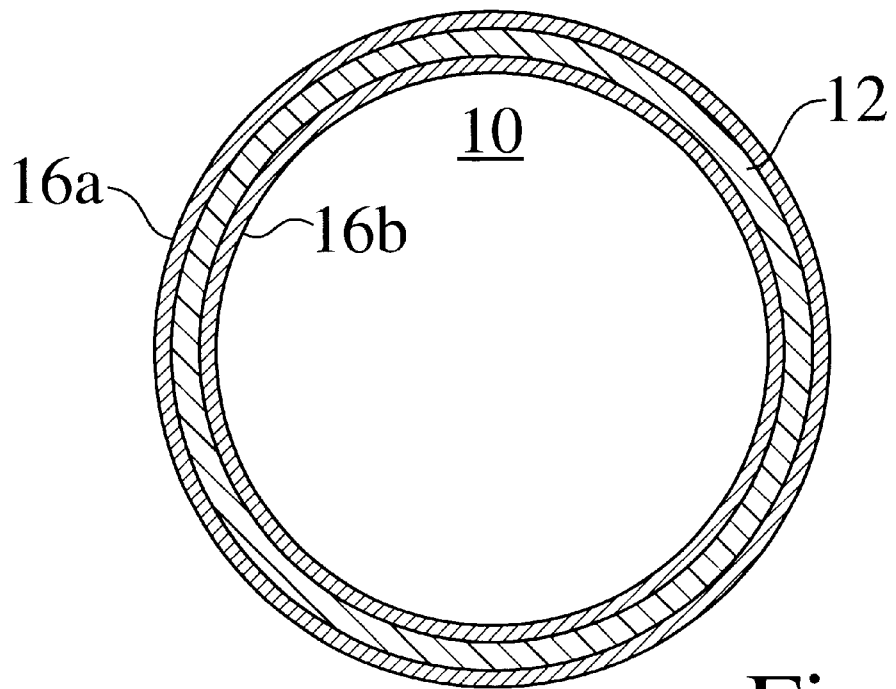
FIG. 4 is a cross-sectional view of a cylindrical shell piezoelectric transducer.

FIG. 4 is a cross-sectional view of a basic cylindrical piezoelectric transducer 10, having a conductive outer layer 16a and a conductive inner layer 16b on a piezoelectric film 12. The thickness of the piezoelectric polymer film 12 effects the sound pressure level (SPL) output of the piezoelectric transducer 10. While the piezoelectric transducer 10 shown is substantially cylindrical, other embodiments are also possible, such as generally oval or polygonal transducers 10.

Transmitter Pen. FIG. 5 is a side view of a transmitter pen 30, which is used as a data entry device. The transmitter pen 30 has a piezoelectric transducer 10 contained near the writing tip 36, as shown in the partial cutaway view in FIG. 6. A writing pen or pointing tip 34 is located within the shell structure of the transmitter pen 30, and has a writing tip 36 that extends though one end of the shell 32. The writing tip 36 typically extends through the hollow central area defined by the piezoelectric transducer 10. A signal input source 22 is located within the shell, and is connected to the piezoelectric transducer 10 by signal leads 18a and 18b. Signal leads 18a, 18b and lead connections 19a, 19b between the power source circuit 22 and the piezoelectric circuit can be made either before or after the piezoelectric transducer 10 is placed into the shell 32.

In a preferred embodiment, a finger guard surrounds the piezoelectric transducer 10. The finger guard 38 protects the piezoelectric transducer 10 from mechanical damage, and confines the angle 76 of the pen 30 against writing surfaces (FIGS. 17, 18) to a defined range of tilt, or angle of operation of the transmitter pen 30.

It is preferable for most transmitter pen designs that the finger guard 38 be acoustically transparent, such that the transmitted output signal 24, which is typically an ultrasonic signal 24, is not reduced or redirected, due to reflection, refraction, or absorption of the output signal 24. Therefore, it is preferable that the design of the finger guard 38 minimize the effects on the radiated ultrasonic beam angles and sound pressure level (SPL) of the output signal 24.

Figure 7:
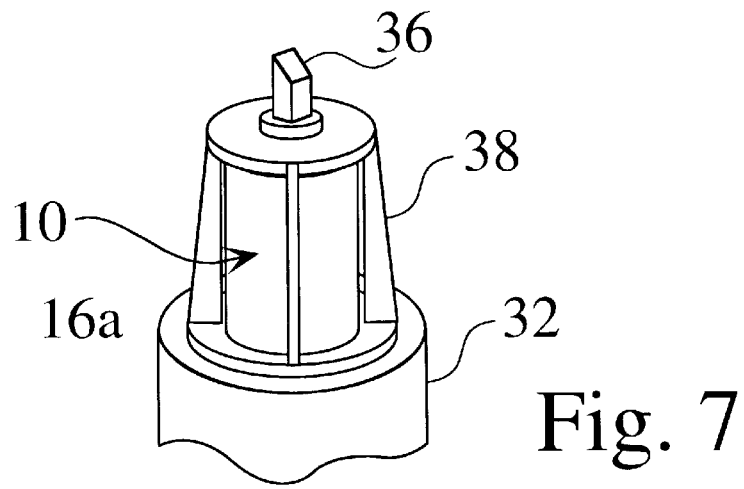
FIG. 7 is a partial perspective view of a transmitter pen having a piezoelectric transducer contained at the writing tip of the pen and surrounded by a finger guard.
Figure 19:
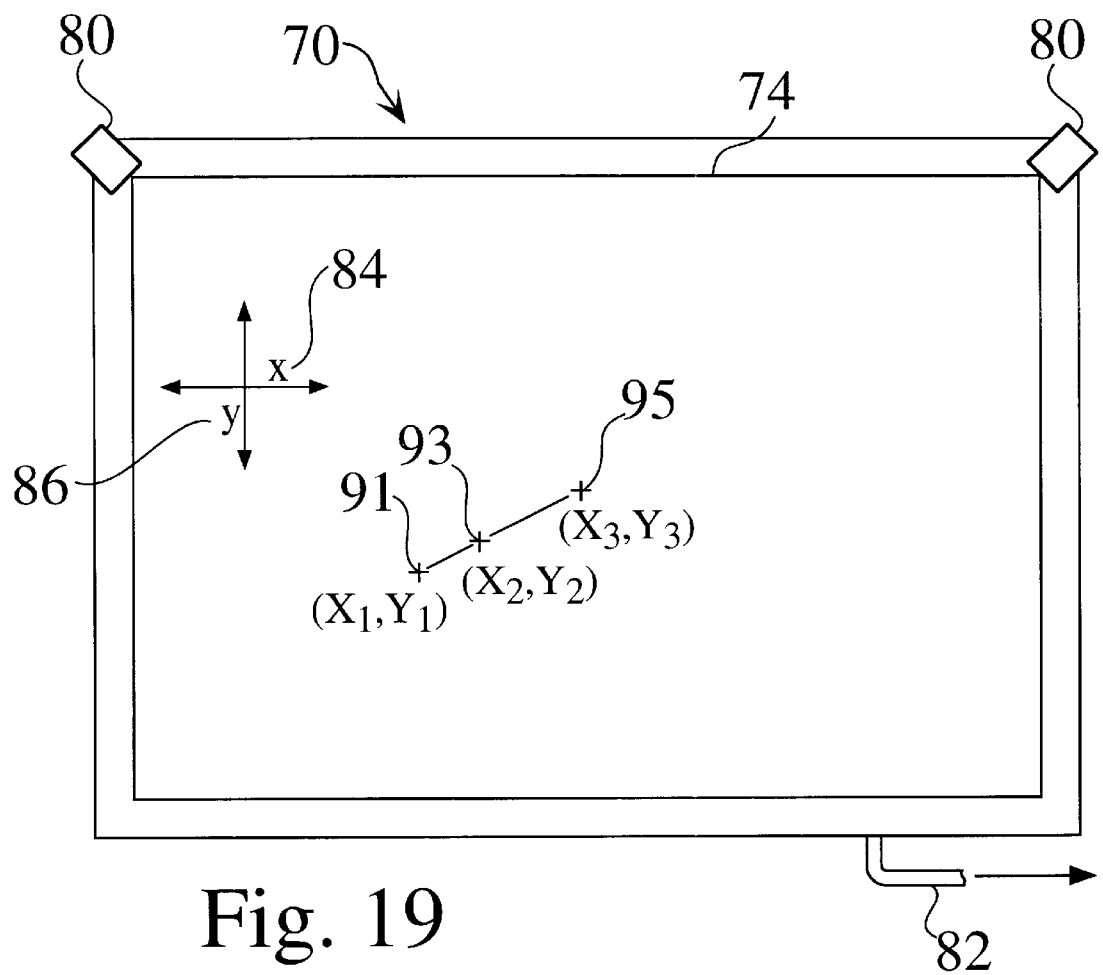
FIG. 19 is a front view of a piezoelectric transmitter pen being used against the writing surface of a white board.

FIG. 7 is a partial perspective view of a transmitter pen 30 having a piezoelectric transducer 10 contained at the writing tip 36 of the pen 30 and surrounded by a finger guard 38. In some embodiments, the finger guard 38 resembles a honeycomb structure, with hollow sections that do not substantially disrupt the radial transmission path of the ultrasonic signal 24 towards all receivers 80 (FIGS. 17, 19). In alternate embodiments, a substantially continuous lens cover may be used. The lens cover can either be acoustically transparent, or can act to focus the transmitted signal towards the external receivers 80.

FIG. 8 is a front view of a flexible circuit assembly 31 which can be used in a preferred embodiment of the transmitter pen 30. The signal input source 22 is located on the flexible circuit assembly 31, and is connected to lead connections 19a, 19b by leads 18a, 18b. The flexible circuit assembly 31 also includes a positive battery contact 33a, a negative battery contact 33b, and a switch contact 39. FIG. 9 is a partial cutaway view of a preferred transmitter pen 30, which includes the flexible circuit assembly 31. The piezofilm transmitter 10 is attached to the flexible circuit assembly 31 by eyelets or heat stakes 19a, 19b. Batteries 35 are located within the shell 32, and make contact with the positive battery contact 33a and the negative battery contact 33b. A switch 37, such as a pressure sensitve switch 37, is also located within the shell 32, and selectively makes contact with the switch contact 39, typically when the marking pen 34 makes contact with a writing surface 74 (FIGS. 17, 19), thereby allowing the transmitter pen to transmit an output signal 24 when the marking pen 34 makes contact with the writing surface 74.

Transducer Design Considerations. The sizing and relative geometry of the piezoelectric transducer 10 can effect the performance of the assembly. As well, a support spool 42 (FIGS. 10, 11) can be included, as discussed below, to improve the transmission performance of the output signal 24.

Transducer Height. The height dimension of the piezoelectric transducer 10, defined by the effective height of the electrode layer, defines the vertical beam angle 26 of the signal 24 transmitted from the piezoelectric transducer 10. When used in a transmitter pen 30, as shown in FIG. 5, the vertical beam angle 26 of the pen 30 is determined by the height of the transducer 10. Therefore, the average writing angle 76 of the transmitter pen 30, when operated by a user, is a design consideration when choosing an appropriate piezoelectric transducer 10 to successfully transmit an output signal 24 to remote receivers 80.

Transducer Diameter. For a specified beam angle and height dimension of the piezoelectric transducer 10, the diameter of the piezoelectric transducer 10 30 is typically minimized to create an ergonomic form factor for the transmitter pen 30. The diameter of the piezoelectric transducer 10, generally defined by the diameter of the piezoelectric film 12, can affect the resonance frequency of the output signal 24 transmitted from the assembly. As the diameter or area of the transducer increases, the resonance frequency decreases. In this manner, the cylinder diameter of the piezoelectric transducer 10 can be chosen to contribute to the tuning of the transmitter pen design for a given receiver frequency.

Figure 10:
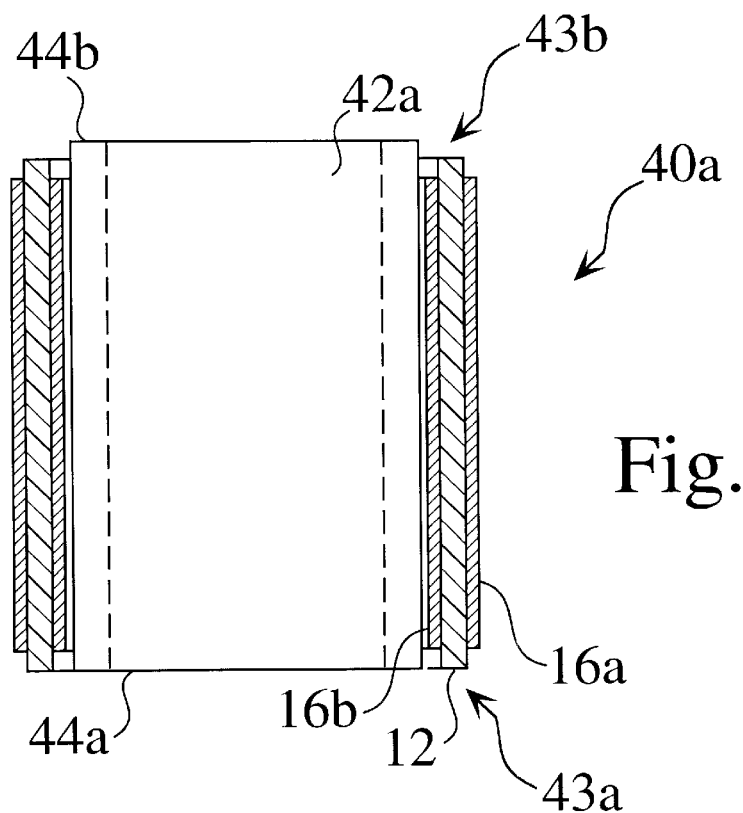
FIG. 10 is a partial cross-sectional view of an alternate embodiment of a piezoelectric transducer and an inner spool.

Transducer Spool. FIG. 10 is a partial crosssectional view 40a of an alternate embodiment of a piezoelectric transducer 10, which includes an inner spool 42a. The piezoelectric transducer shell 12 is loosely supported by the spool 42a. When the piezoelectric transducer 12 shell is activated by the input signal 21, the spool 42a acts to maintain the shape and alignment of the transducer 10, without adversely affecting the sound pressure level of the output signal 24. While the spool 42a can be a separate component located within the piezoelectric transducer shell 12, it can also be an integrated detail of a shell of a writing pen 34, when the piezoelectric transducer 10 is used within a transmitter pen 30. Lead connections 19a and 19b between the power source circuit 22 and the conductive outer layers 16a and 16b can be made either before or after the piezoelectric transducer 10 is placed onto the spool 42a.

In operation, the PVDF film 12 typically expands and contracts slightly, due to the piezoelectric effect of layer 12, from the input of electrical energy signal 21 to produce an output mechanical signal 24.

The piezoelectric transducer 10 should be loosely contained around the spool 42, which allows the piezoelectric transducer 10 to resonate freely when activated. There are also several techniques with which to affix or mount the piezoelectric film 12 to the spool 42, which also allow the piezoelectric transducer 10 to resonate freely when activated. The piezoelectric film 12 can be affixed to the spool 42 by either the bottom edge 43a of the film 12 and the spool 42, as shown in FIG. 9, or by the top edge 43b of the film 12 and the spool 42.

In most embodiments, either the bottom edge 43a or the top edge 43b of the piezoelectric transducer 10 is kept free, which allows the piezoelectric transducer 10 to expand and contract, in reaction to thermal expansion and contraction, and in reaction to vibration from electrical excitation. Double edged support can cause damage to the film 12 over wide temperature ranges.

Adhesive techniques may also be used to attach the piezoelectric film to the spool 42, such as with pressure-sensitive adhesives or light-curable manufacturing-grade adhesives, which can be applied to either or both surfaces, and then cured to quickly produce a permanent attachment.

Figure 11:
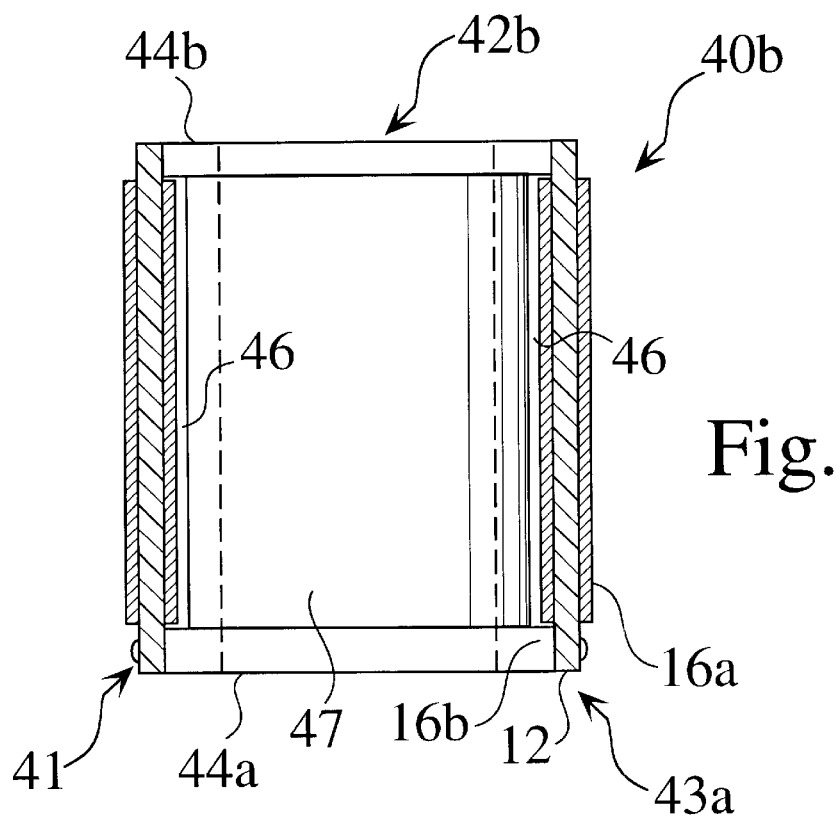
FIG. 11 is a partial cross-sectional view of an alternate embodiment of a piezoelectric transducer and an inner spool having a back air cavity.

FIG. 11 is a partial crosssectional view 40b of an alternate embodiment of a piezoelectric transducer 10 and an inner spool 42b, in which a recess in the spool 42 creates a uniform air cavity 46 defined between the inner diameter 47 of the spool 42b and the piezoelectric transducer 10. The thickness of the air cavity 46 may be designed to substantially increase the sound pressure level (SPL) output produced by the energized piezoelectric transducer, as compared to a piezoelectric transducer 10 and a spool 42a with a non-uniform air cavity. In one embodiment, the sound pressure level (SPL) output is increased up to 100 percent. This allows for easier control of the sound pressure level and resonant frequency of the piezoelectric transducer 10. The formed air cavity 46 also allows the active area of the film 12 defined by the area of film 12 covered by electrodes 16a and 16b to avoid direct contact with the spool 42, since the piezoelectric film 12 on the piezoelectric transducer 10 can contact either the bottom edge 44a or the top edge 44b of the spool 42b. This assures that the active area of the film 12 can freely resonate.

Figure 12:
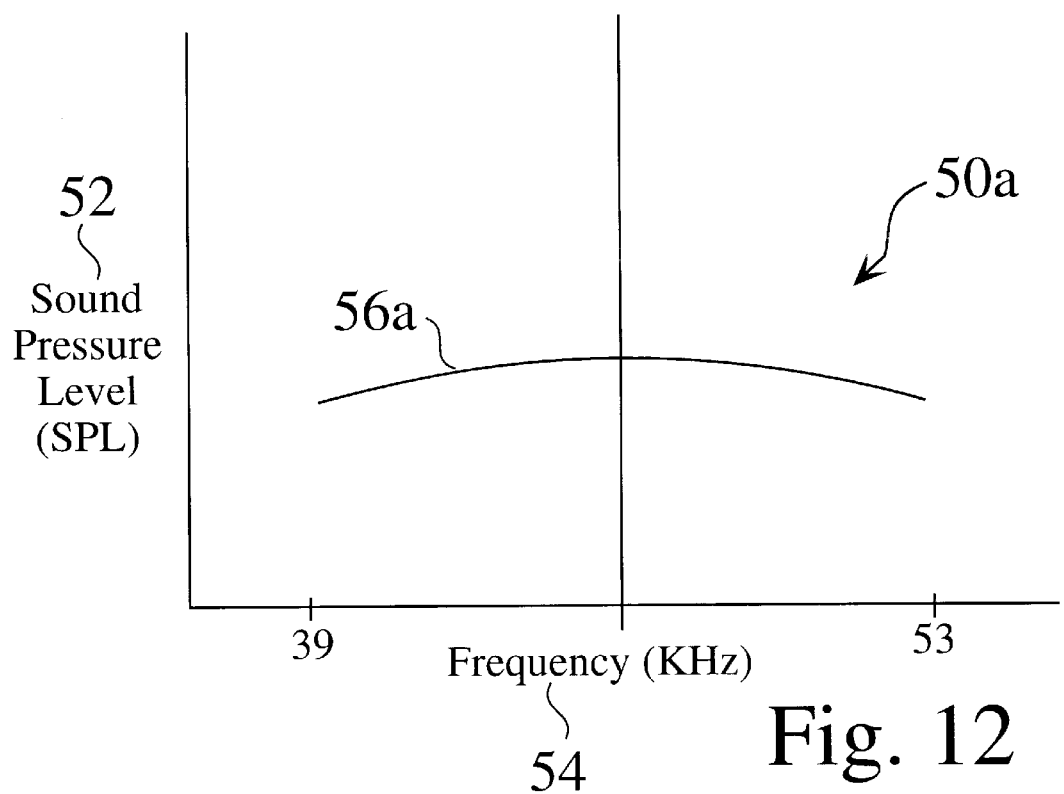
FIG. 12 is a graph of the output sound pressure level from a piezoelectric transducer.
Figure 13:
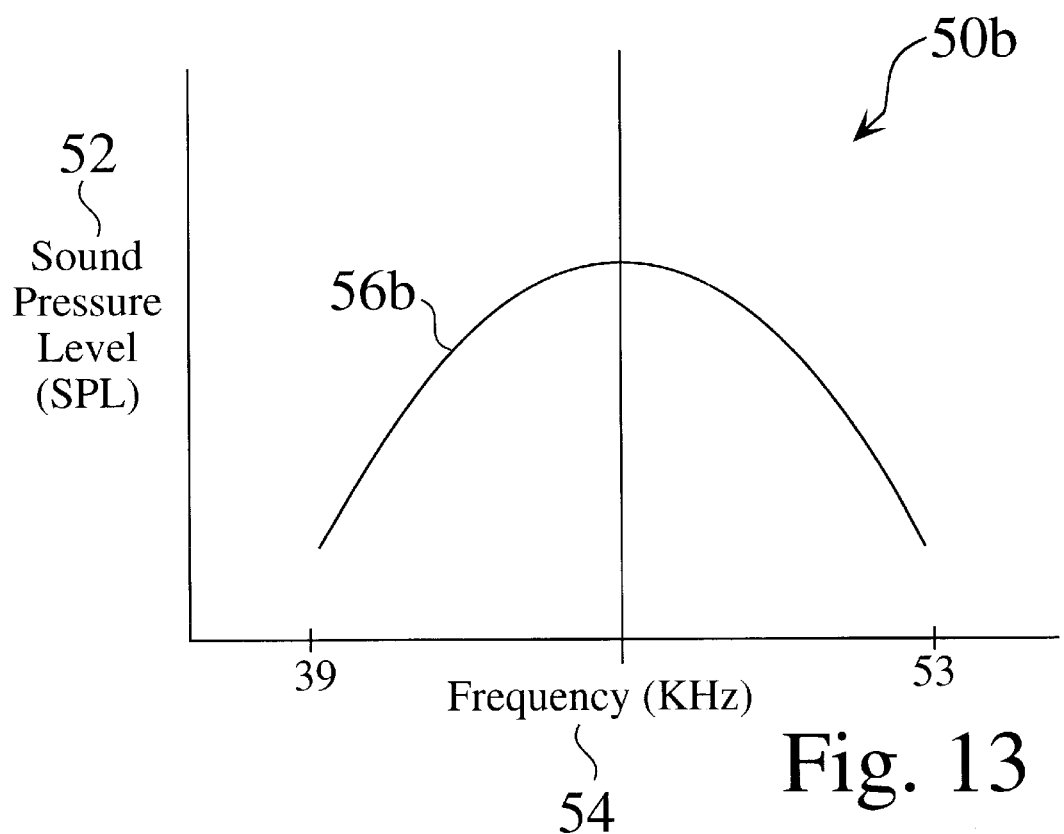
FIG. 13 is a graph of the output sound pressure level from a piezoelectric transducer with an inner spool.

Transducer Performance. FIG. 12 is a graph 50a of the output sound pressure level 56a from a piezoelectric transducer 10, without an inner spool 42, which shows sound pressure level 52 as a function of output frequency 54 for the output signal 24. FIG. 13 is a graph 50b of the output sound pressure level 56b from a similar piezoelectric transducer 10 with an inner spool 42. Formed Piezoelectric Transducer Assembly. While the piezoelectric transducer 10 can be formed from a continuous piezoelectric shell 12, the piezoelectric transducer 10 can alternately be formed by other methods. FIG. 14 is a front view of a flat piezoelectric film assembly 60 having opposing conductive layers 16a, 16b and lead attachment extension tabs 62a and 62b. FIG. 15 is a side view of a flat piezoelectric assembly 60 having opposing conductive layers 16a and 16b and lead attachment extension tabs 62a and 62b. The flat piezoelectric assembly 60, available as a commercial or custom component from Measurement Specialties, Inc. of Fairfield, N.J. or Ktech Corp., of Albuquerque, N.Mex., is formed into a shell structure which is used as a piezoelectric transducer 10b. Part No. DT-40 from Measurement Specialties, Inc. is a suitable commercial component. Outer layers 63a and 63b provide protection for conductive layers 16a and 16b and conductive tabs 64a and 64b, respectively.

The lead attachment extension tabs 62a and 62b serve to simplify the manufacturing process of a transducer 10 that is suitable for use in a data entry pen 30. PVDF film 12 is easy to cut and form. Electrode extension 64a is an extension of conductive layer 16a that extends onto extension tab 62a. Similarly, electrode extension 64b is an extension of conductive layer 16b that extends onto extension tab 62b. Signal leads 18a and 18b are connected to electrode extensions 64a and 64b. In an alternate embodiment, connector holes 66a and 66b provide a mechanical means for connecting signal leads 18a and 18b to electrode extensions 64a and 64b, respectively.

FIG. 16 is a perspective view of a piezoelectric transducer shell 10b formed from a flat piezoelectric assembly 60. In most embodiments, the piezoelectric film 60 is first rolled into and confined in a cylindrical shape, commonly with a small overlapping region 49. The overlapping region 49 is typically connected by adhesive, heat stake, rivet, eyelet, or ultrasonic bonding techniques. The rolled piezoelectric transducer 10 is then preferably placed onto a spool 42.

The piezoelectric transducer 10 is either loosely contained by the spool 42, or is attached to the spool 42, typically by heat staking, riveting or ultrasonic bonding. It is preferable that the attachment method used reduces the manufacturing cost and improves the yield and manufacturability of the transducer assembly.

Production of Formed Piezoelectric Transducer Production Process.

The formed piezoelectric transducer 10b production process comprises the following steps:
  i) forming conductive layers 16a and 16b on opposing sides of a piezoelectric film layer 12 having a bottom edge 43a, a top edge 43b, a first side edge 45a, and a second side edge 45b;
  ii) rolling the piezoelectric film layer 10 into a shell having a hollow region 47 defined therein, wherein the first side edge 45a and second side edge 45b overlap to form an overlapping region 49; and
  iii) forming a connection 68 between the first side edge 45a and second side edge 45b within the overlapping region 49.

The process may also include an additional step of connecting signal leads 18a and 18b to the conductive layers 16a and 16b. Additionally, the process may also include a step of containing a spool 42 having a bottom edge 44a and a top edge 44b within the hollow region 47, and preferably aligning either the bottom edge 44a of the spool 42 to the bottom edge 43a of the piezoelectric film layer 12, or attaching the top edge 44b of the spool 42 to the top edge 43b of the piezoelectric film layer 12.

Data Entry Systems. FIG. 17 is a perspective view of data entry system 70, in which a piezoelectric transmitter pen 30 is shown at an inclined angle 76 in relation to a writing surface 72, wherein the inclined angle is indicated as θ. The writing surface 72, such as a white board or writing tablet, typically has a data entry area 74, which includes an X coordinate axis 84, and a Y coordinate axis 86. Output signals 24 from the piezoelectric transmitter pen 30 are output from the piezoelectric transducer 10, and are received by one or more receivers 80. The output signals 24 are then processed in the receiver modules 80, or are transferred to an external signal processor 90 through cable 82. The output signals 24 can be used to transmit information to the remote receivers, such as the location of the pointing tip of the pen in relation the data entry area 74, or other appropriate information, as desired. The output signals 24 may consist of only ultrasound signals, or may also be any combination of ultrasound, infrared, and optical signals.

Figure 18:
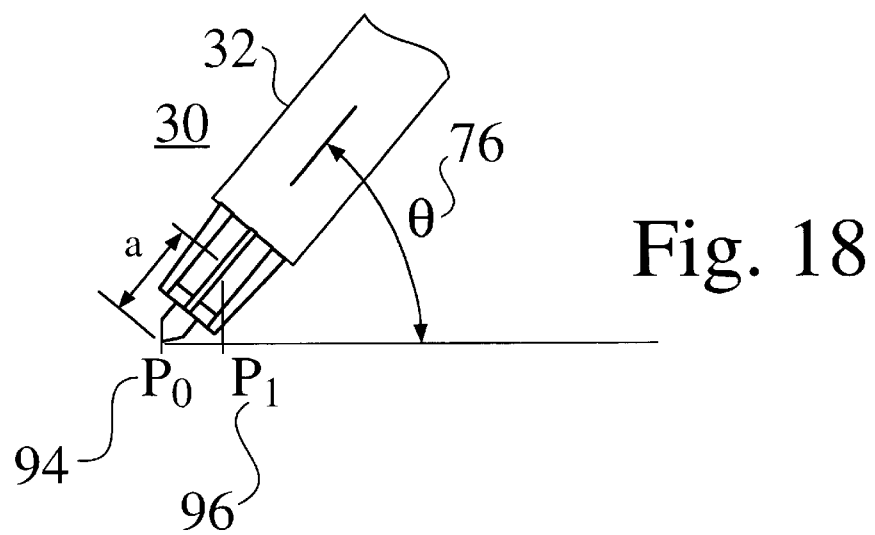
FIG. 18 is a partial detailed side view of a piezoelectric transmitter pen inclined against a writing surface.

FIG. 18 is a partial detailed side view which shows the relative geometry between a piezoelectric transmitter pen 30 and a writing surface 72. Point $P_0$ (94) corresponds to the location of the pointing tip 36 of the pen 30 on the writing surface 72. Point $P_1$ (96) corresponds to the projected location of the piezoelectric transducer 10 of the transmitter pen 30 onto the writing surface 72. FIG. 19 is a front view of a piezoelectric transmitter pen 30 being used against the writing surface 74 of a wall-mounted white board 72, and illustrates the calculated path of the inclined piezoelectric transmitter pen 30 against the writing surface 72, traveling from a first point 91 having coordinates ($X_1$, $Y_1$) along a path, through a second calculated point 93 having coordinates ($X_2$, $Y_2$), and ending at a third point 95 having coordinates ($X_3$, $Y_3$).

Figure 20:
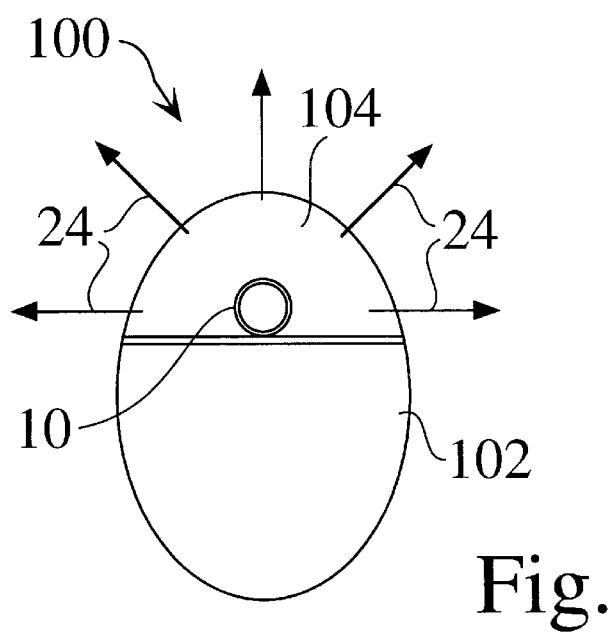
FIG. 20 is a top view of a piezoelectric transmitter mouse.

Alternate Embodiments. FIG. 20 is a top view of a piezoelectric transmitter mouse 100, wherein a piezoelectric transducer 10 is placed within a portable mouse housing 102. In a similar manner to the transmitter pen 30, the piezoelectric transmitter mouse 100 is used as a data entry device to send one or more output signals to remote receivers 80. A transducer guard 104 is preferably placed over the piezoelectric transducer 10. In a similar manner to the transmitter pen embodiment finger guard 38, it is preferable for most transmitter mouse designs that the transducer guard 104 be acoustically transparent, such that the transmitted output signal 24, which is typically an ultrasonic signal 24, is not reduced or redirected, due to reflection, refraction, or absorption of the output signal 24. Therefore, it is preferable that the design of the transducer guard 104 reduce the effects on the radiated ultrasonic beam angles and sound pressure level (SPL) of the output signal 24.

Figure 21:
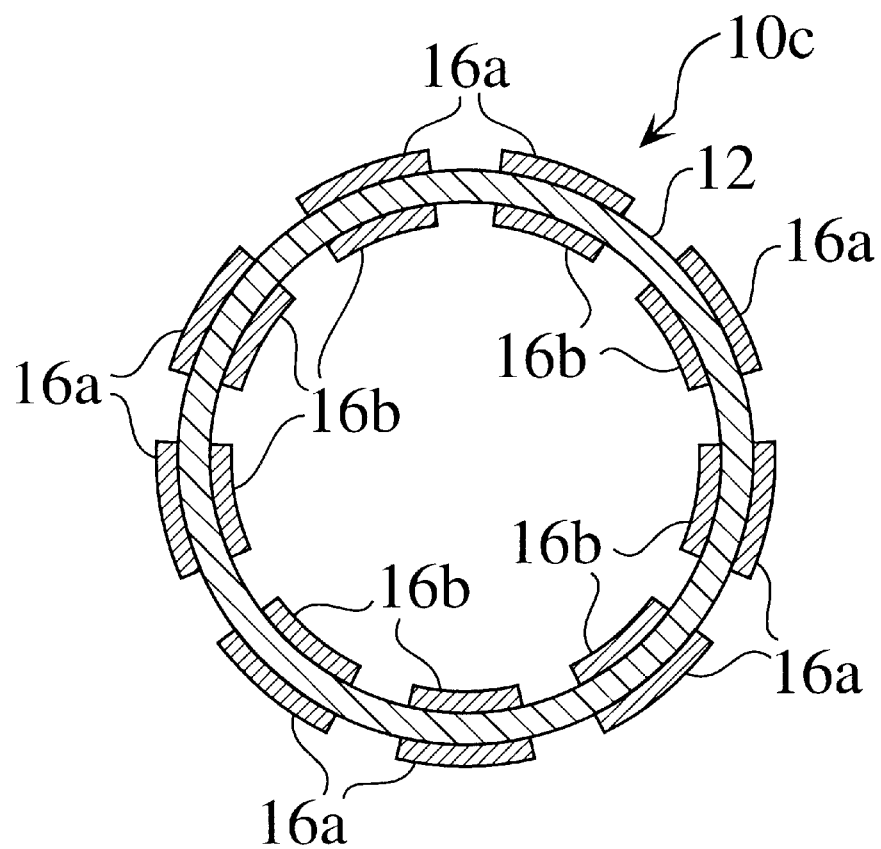
FIG. 21 is a cross-sectional view of a multiple-element output cylindrical piezoelectric transducer, wherein the element shape is determined by the pattern of the electrodes on the piezoelectric substrate.
Figure 22:
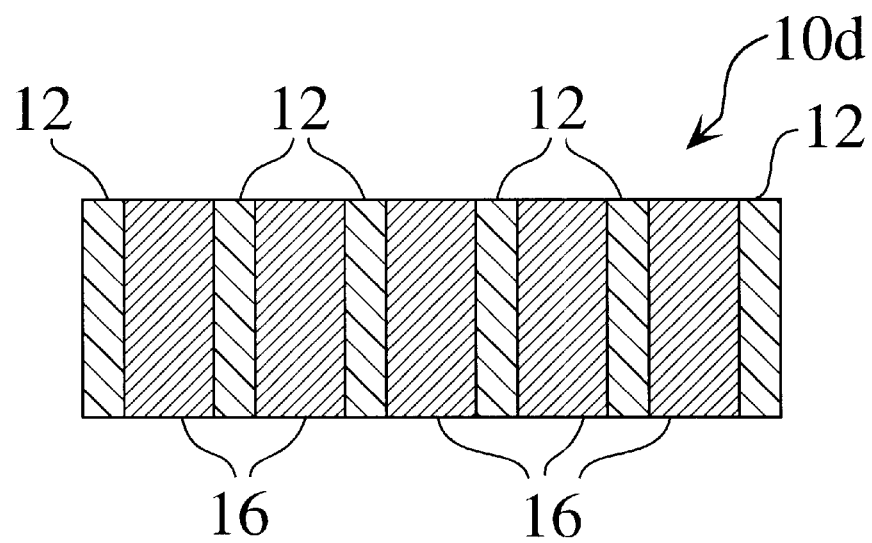
FIG. 22 is a front view of a multiple-element output planar piezoelectric transducer, wherein the element shape is determined by the pattern of the electrodes on the piezoelectric substrate.

FIG. 21 is a cross-sectional view of a multiple element cylindrical transducer 10c, whereby a pattern of opposing electrode pairs 16a, 16b are located on the outer and inner surfaces of a piezoelectric cylinder 12. The essentially cylindrical transducer 10c is formed by applying a pattern of discontinuous electrodes 16a, 16b to a piezoelectric layer 12. FIG. 22 is a side view of a 20 multiple element transducer 10d formed by a discontinuous electrode pattern, whereby alternating layers of piezoelectric material 12 and electrode layers 16 are formed together.

Figure 23:
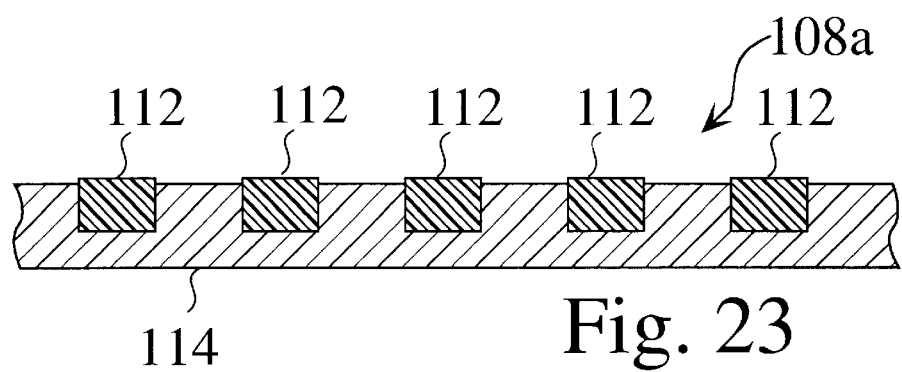
FIG. 23 is a cross-sectional view of segmented piezoelectric transducer elements within an insulative substrate shown in a planar assembly.
Figure 24:
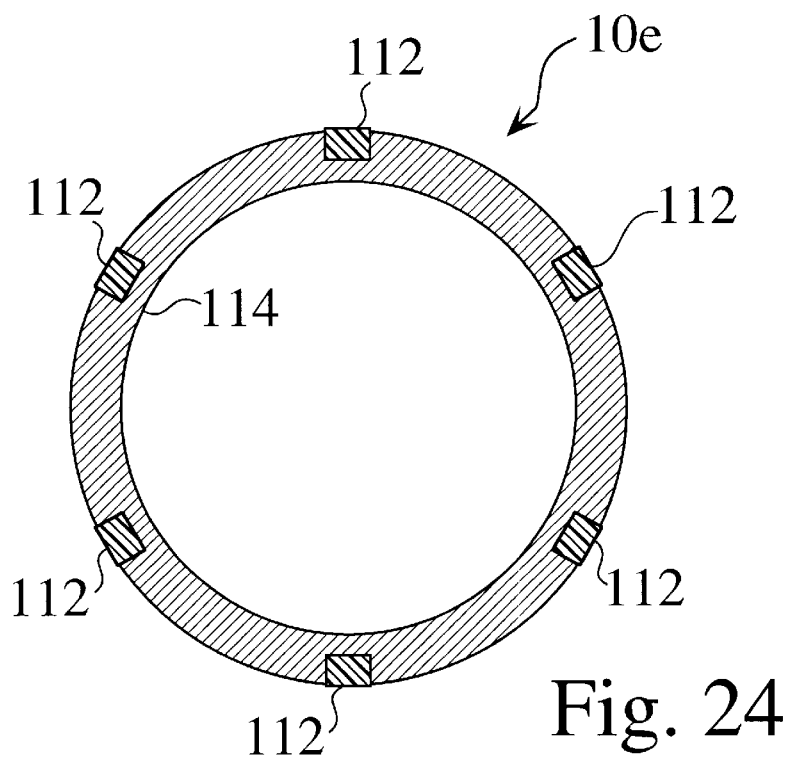
FIG. 24 is a cross-sectional view of segmented piezoelectric transducers within an insulative substrate shown in a cylindrical assembly.

FIG. 23 is a cross-sectional view of a composite 108a of piezoelectric material segments 112 within an insulative substrate 114. The composite 108a is either initially formed as a planar substrate, and then processed into a transducer shell, as discussed above, or is directly formed into a shell structure. FIG. 24 is a cross-sectional view of a segmented piezoelectric transducer 10e, whereby piezoelectric segments 112 are selectively powered, either together or separately, to produce an output signal 24. The piezoelectric segments 112 are typically constructed from ceramics, such as lead zirconium titanate (PZT), lithium niobate (LiNb), or lead metaniobate (PbNb) materials.

Figure 25:
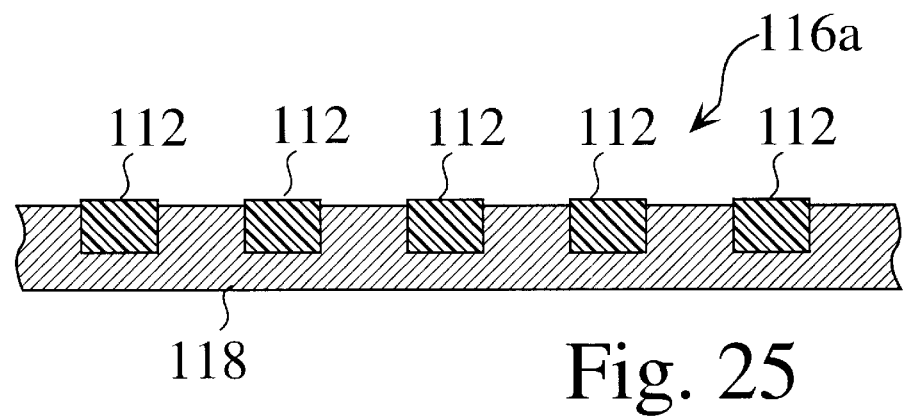
FIG. 25 is a cross-sectional view of segmented piezoelectric transducer elements within a conductive substrate.

FIG. 25 is a cross-sectional view of a composite 116a of segmented piezoelectric material 12 within a conductive substrate 114. The conductive substrate 114 can be connected to first power lead 18a, while the upper electrodes of the piezoelectric segments 112 are connected, either together or separately, to a second power lead 18b.

Figure 26:
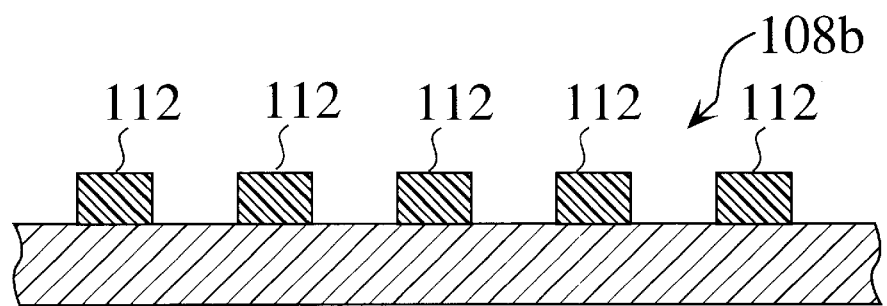
FIG. 26 is a cross-sectional view of segmented piezoelectric transducer elements located on an insulative planar substrate.
Figure 27:
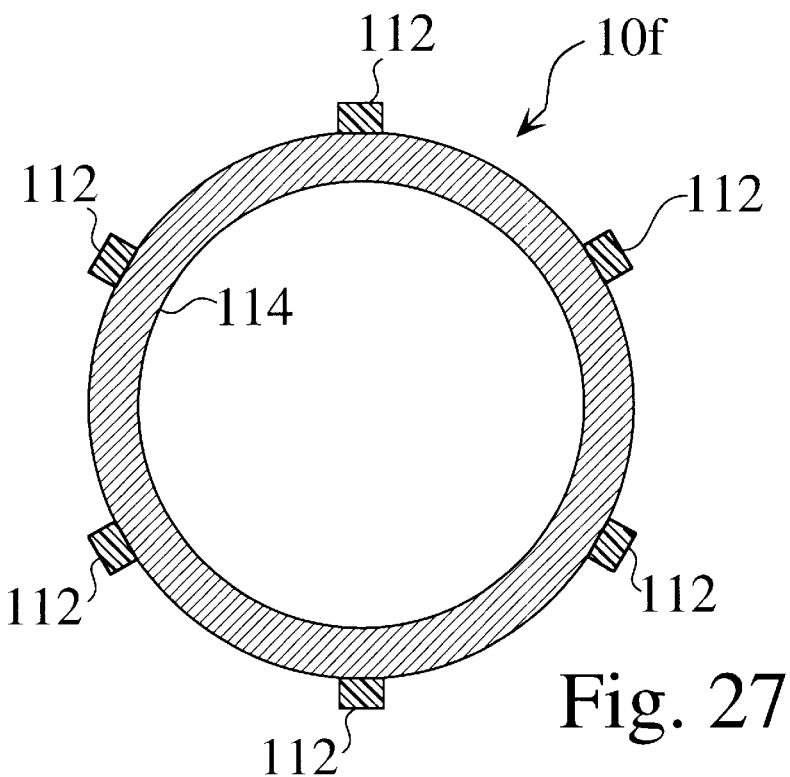
FIG. 27 is a cross-sectional view of segmented piezoelectric transducers elements located on an insulative cylindrical substrate.
Figure 28:
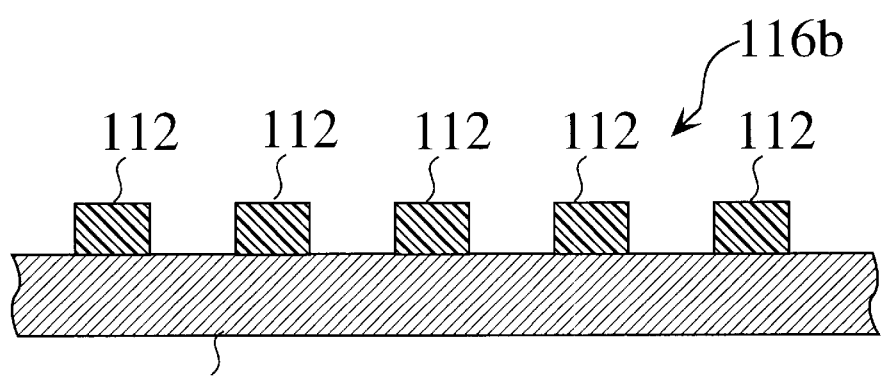
FIG. 28 is a cross-sectional view of segmented piezoelectric transducer elements located on a conductive planar substrate.

In alternate embodiments, piezoelectric elements 112 are mounted to one surface of insulative substrates 114 or conductive substrates 118. FIG. 26 is a cross-sectional view of a composite 108b of segmented piezoelectric transducer elements 112 located on an insulative planar substrate 114. FIG. 27 is a cross-sectional view a surface-mounted segmented piezoelectric transducer 10f, in which segmented piezoelectric transducer elements 112 located on an insulative cylindrical substrate 114. FIG. 28 is a cross-sectional view of a composite 116b of segmented piezoelectric transducer elements 112 located on a conductive planar substrate 118.

Figure 29:
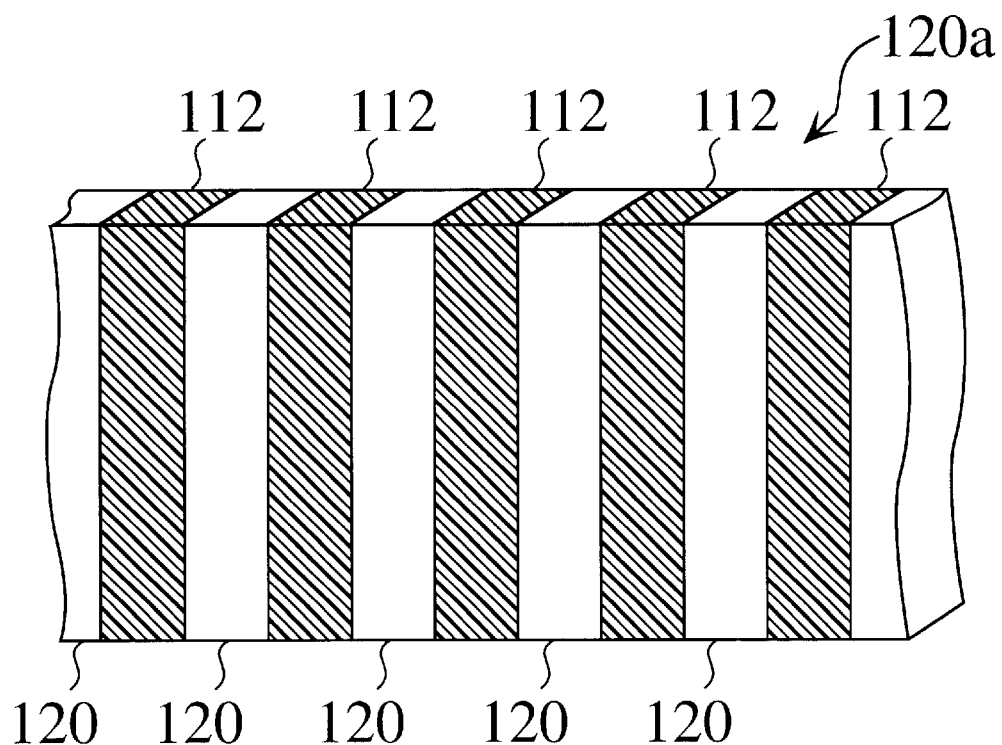
FIG. 29 is a partial cutaway view of a planar composite comprising separated piezoelectric segments.
Figure 30:
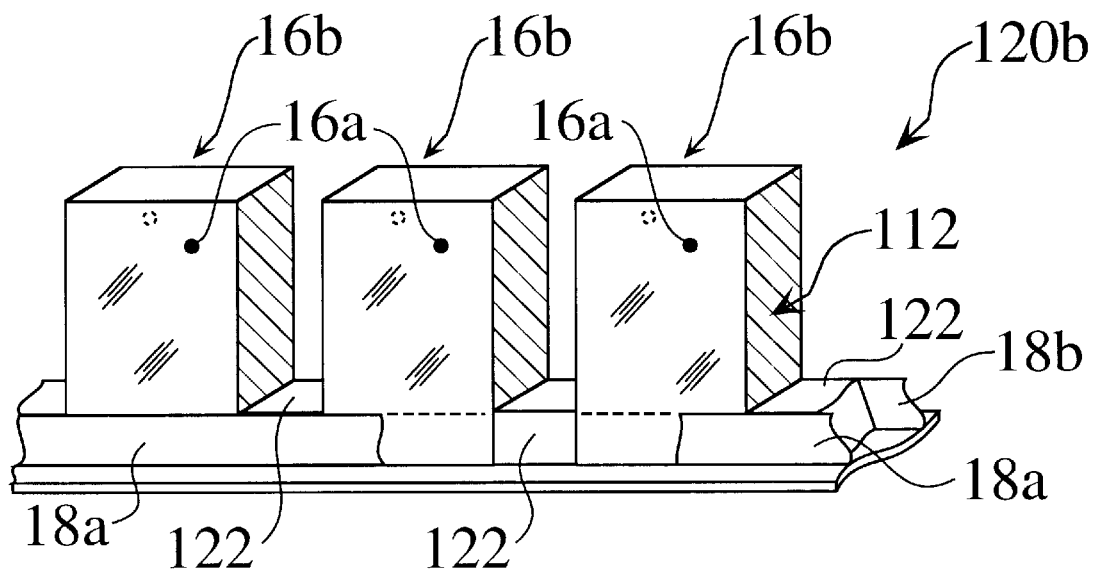
FIG. 30 is a partial cutaway view of an alternate composite structure comprising separated piezoelectric segments, which are separated by an intermediate material.
Figure 31:
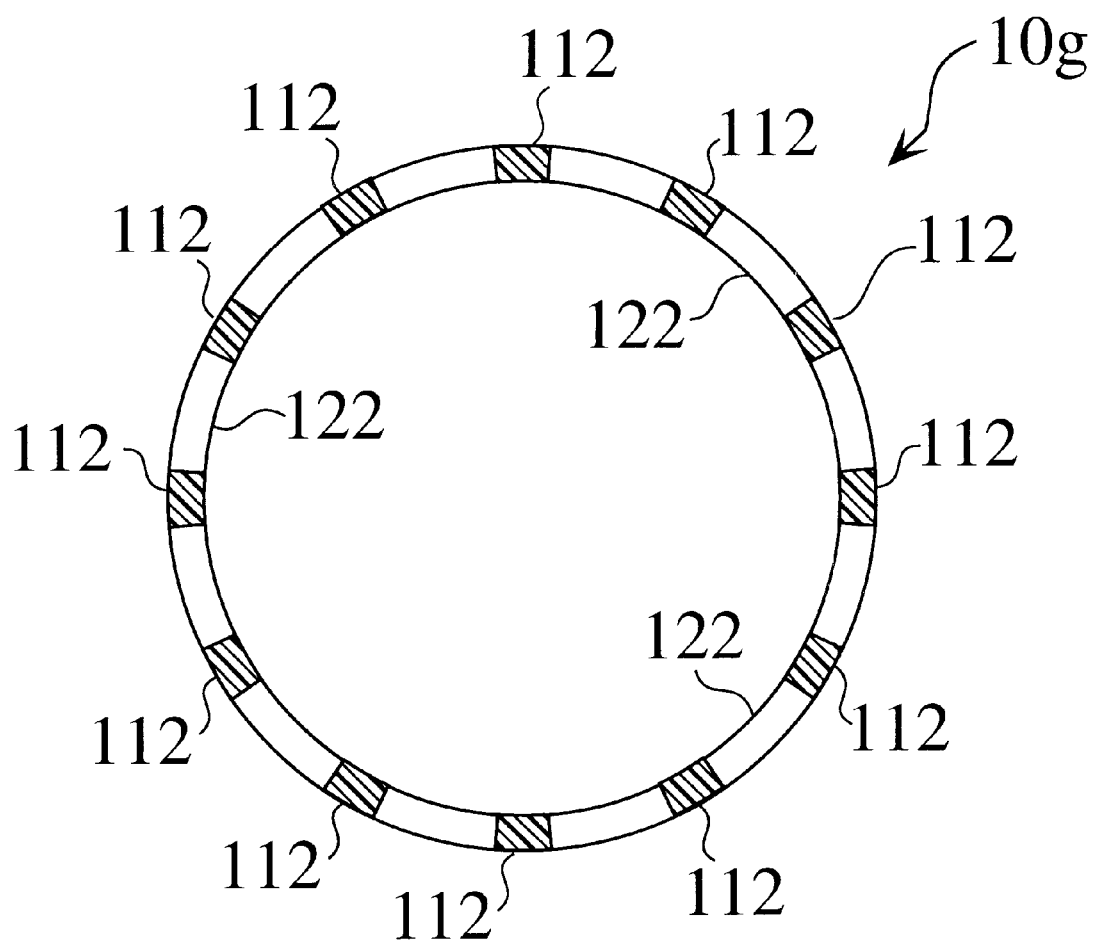
FIG. 31 is a cross-sectional view of a composite segmented piezoelectric transducer.

FIG. 29 is a partial cutaway view of a composite structure 120a comprising separated piezoelectric segments 112, which are separated by an intermediate material 122. The composite 120 is formed, either as a continuous material, or is directly formed into a shell structure. FIG. 30 is a partial cutaway view of an alternate composite structure 120b comprising separated piezoelectric segments 112, which are separated by an intermediate material 122. Electrodes 16a and 16b located on opposing surfaces of the piezoelectric segments 112 are bonded to electrical leads 18a and 18b. Bonding may be accomplished by electrically conductive epoxy, solder, or other means of maintaining contact between electrodes 16a, 16b and electrical leads 18a, 18b. FIG. 31 is a cross-sectional view of a composite segmented piezoelectric transducer 10g, whereby piezoelectric segments 112 are selectively powered, either together or separately, to produce an output signal 24. The composite structure 120 is typically formed from ceramic piezoelectric segments 112 and polymer segments 122.

Although the piezoelectric transducer and its methods of use are described herein in connection with data entry and computer input systems, the techniques can be implemented for other instrumentation control or display devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A transmitter pen comprising:
    piezoelectric transducer formed from a flexible film having an inner surface and an outer surface, the transducer having a bottom edge and a top edge, the outer surface extending from the bottom edge to the top edge, the transducer also having a hollow inner region defined between the bottom edge and the top edge, the inner surface extending from the bottom edge to the top edge within the hollow inner region, an outer conductive layer deposited on the outer surface of the film, and an inner conductive layer deposited on the inner surface of the film, the piezoelectric transducer having an axis extending from the bottom edge to the top edge within the hollow inner region;
    a writing tip which extends through the hollow inner region and beyond the top edge;
    means for activating the inner conductive layer and the outer conductive layer by an applied voltage;
    such that the piezoelectric transducer resonates upon the activation to produce an output signal waveform that is transmitted radially outward from the outer conductive layer about the axis of the transducer.

2. The transmitter pen of claim 1, wherein the piezoelectric shell is a cylindrical piezoelectric shell.

3. The transmitter pen of claim 1, wherein the piezoelectric shell is a polygonal piezoelectric shell.

4. A transmitter pen comprising:
    a piezoelectric transducer having a bottom edge, a top edge, an outer surface extending from the bottom edge to the top edge, a hollow inner region defined between the bottom edge and the top edge, and an inner surface extending from the bottom edge to the top edge within the hollow inner region, an outer conductive layer deposited on the outer surface, and an inner conductive layer deposited an the inner surface, the piezoelectric transducer having an axis extending from the bottom edge to the top edge within the hollow inner region;
    a writing tip which extends through the hollow inner region and beyond the top edge;
    means for activating the inner conductive layer and the outer conductive layer by an applied voltage; and
    a spool having an outer surface, a bottom edge having a first circumference and a top edge having a second circumference, and a hollow inner region defined between the bottom edge and the top edge, the spool located within the inner region of the piezoelectric shell, the bottom edge of the spool substantially aligned with the bottom edge of the piezoelectric shell, the top edge of the spool substantially aligned with the top edge of the piezoelectric shell, and the writing tip extending through the hollow inner region of the spool and extending from the top edge of the hollow inner region of the spool,
    such that the piezoelectric transducer resonates upon the activation to produce an output signal waveform that is transmitted radially outward from the outer conductive layer about the axis of the transducer, and such that the spool acts to increase the output sound pressure level for the transducer.

5. The transmitter pen of claim 4, wherein the bottom edge of the piezoelectric shell is attached to the bottom edge of the spool.

6. The transmitter pen of claim 4, wherein the top edge of the piezoelectric shell is attached to the top edge of the spool.

7. The transmitter pen of claim 4, wherein the outer surface of the spool further comprises:
    a central surface between the bottom edge of the spool and the top edge of the spool having a central circumference less than the first circumference of the bottom edge of the spool and the circumference of the top edge of the spool, such that a substantially uniform air cavity is defined between the central surface of the spool and the inner surface of the piezoelectric shell.

8. The transmitter pen of claim 4, wherein the piezoelectric shell is a piezoelectric film.

9. The transmitter pen of claim 4, wherein the piezoelectric shell further comprises a first lead extension tab and second lead extension tab on the bottom edge of the piezoelectric shell, wherein the outer conductive layer extends onto the first lead extension tab, and the inner conductive layer extends onto the second lead extension tab.

10. A transmitter pen comprising:
a piezoelectric transducer having a bottom edge, a top edge, an outer surface extending from the bottom edge to the top edge, a hollow inner region defined between the bottom edge and the top edge, and an inner surface extending from the bottom edge to the top edge within the hollow inner region, an outer conductive layer deposited on the outer surface, and an inner conductive layer deposited on the inner surface, the piezoelectric transducer having an axis extending from the bottom edge to the top edge within the hollow inner region;
a writing tip which extends through the hollow inner region and beyond the top edge; and
means for activating the inner conductive layer and the outer conductive layer by an applied voltage;
such that the piezoelectric transducer resonates upon the activation to produce an output signal waveform that is transmitted radially outward from the outer conductive layer about the axis of the transducer,
wherein one or both of the outer and inner conductive layers contains silver.

11. The transmitter pen of claim 10, wherein the outer conductive layer is a silver based compound.

12. The transmitter pen of claim 10, wherein the outer conductive layer is a silver based alloy.

13. The transmitter pen of claim 10, wherein the outer conductive layer is a mixture of carbon and silver.

14. The transmitter pen of claim 10, wherein the inner conductive layer is silver.

15. The transmitter pen of claim 10, wherein conductive layer is a silver based compound.

16. The transmitter pen of claim 10, wherein the inner conductive layer is a silver based alloy.

17. The transmitter pen of claim 10, wherein the inner conductive layer is a mixture of carbon and silver.

18. A transducer activatable by an applied voltage, the transducer comprising:
a piezoelectric shell fanned from a flexible film having an inner surface and an outer surface, the piezoelectric shell having a bottom edge and a top edge, the outer surface extending from the bottom edge to the top edge, the piezoelectric shell also having a hollow inner region defined between the bottom edge and the top edge, the inner surface extending from the bottom surface to the top surface within the hollow inner region, the piezoelectric shell having an axis extending from the bottom edge to the top edge within the hollow inner region;
an outer conductive layer deposited on the outer surface of the film; and
an inner conductive layer deposited on the inner surface of the film;
such that when the outer deposited conductive layer and the inner deposited conductive layer are activated by the applied voltage, the piezoelectric shell resonates to produce an output signal waveform that is transmitted radially outward from the outer surface about the axis of the transducer.

19. The ultrasonic transducer of claim 18, further comprising:
means for applying an input signal to the outer conductive layer and the inner conductive layer.

20. The ultrasonic transducer of claim 18, wherein the piezoelectric shell comprises a cylindrical piezoelectric shell.

21. The ultrasonic transducer of claim 18, wherein the piezoelectric shell comprises a polygonal piezoelectric shell.

22. A transducer activatable by an applied voltage, the transducer comprising:
a piezoelectric shell having a bottom edge, a top edge, an outer surface extending from the bottom edge to the top edge, a hollow inner region defined between the bottom edge and the top edge, and an inner surface extending from the bottom surface to the top surface within the hollow inner region, the piezoelectric shell having an axis extending from the bottom edge to the top edge within the hollow inner region;
an outer conductive layer deposited on the outer surface;
an inner conductive layer deposited on the inner surface; and
a spool having an outer surface, bottom edge having a first circumference and a top edge having a second circumference located within the hollow inner region of the piezoelectric shell, the bottom edge of the spool substantially aligned with the bottom edge of the piezoelectric shell, and the top edge of the spool substantially aligned with the top edge of the piezoelectric shell,
such that when the outer deposited conductive layer and the inner deposited conductive layer are activated by the applied voltage, the piezoelectric shell resonates to produce an output signal waveform that is transmitted radially outward from the outer surface about the axis of the transducer, and such that the spool acts to increase the output sound pressure level for the transducer.

23. The ultrasonic transducer of claim 22, wherein the bottom edge of the piezoelectric shell is attached to the bottom edge of the spool.

24. The ultrasonic transducer of claim 22, wherein the top edge of the piezoelectric shell is attached to the top edge of the spool.

25. The ultrasonic transducer of claim 22, wherein the spool further comprises:
a central surface between the bottom edge of the spool and the top edge of the spool having a central circumference less than the first circumference of the bottom edge of the spool and the circumference of the top edge of the spool, such that a substantially uniform air cavity is defined between the central surface of the spool and the inner surface of the piezoelectric shell.

26. The ultrasonic transducer of claim 22, wherein the spool further comprises a hollow inner region defined between the bottom edge and the top edge, and further comprising:
a writing pen having a pointing tip, wherein the pointing tip extends through the hollow inner region of the spool and extends from the top edge of the hollow inner region of the spool.

27. The ultrasonic transducer of claim 22, wherein the piezoelectric shell comprises a piezoelectric film.

28. The ultrasonic transducer of claim 22, wherein the piezoelectric shell further comprises a first lead extension tab and a second lead extension tab on the bottom edge of the piezoelectric shell, wherein the outer deposited conductive layer extends onto the first lead extension tab, and the inner conductive layer extends onto the second lead extension tab.

29. A transducer activatable by an applied voltage, the transducer comprising:

a piezoelectric shell having a bottom edge, a top edge, an outer surface extending from the bottom edge to the top edge, a hollow inner region defined between the bottom edge and the top edge, and an inner surface extending from the bottom surface to the top surface within the hollow inner region, the piezoelectric shell having an axis extending from the bottom edge to the top edge within the hollow inner region;

an outer conductive layer deposited on the outer surface;

an inner conductive layer deposited on the inner surface;

a protective coating layer over one or both of the inner and the outer deposited conductive layers; and means for activating the inner conductive layer and the outer conductive layer by an applied voltage;

such that when the outer deposited conductive layer and the inner deposited conductive layer are activated by the applied voltage, the piezoelectric shell resonates to produce an output signal waveform that is transmitted radially outward from the outer surface about the axis of the transducer.

30. A transducer activatable by an applied voltage, the transducer comprising:

a piezoelectric shell having a bottom edge, a top edge, an outer surface extending from the bottom edge to the top edge, a hollow inner region defined between the bottom edge and the top edge, and an inner surface extending from the bottom surface to the top surface within the hollow inner region, the piezoelectric shell having an axis extending from the bottom edge to the top edge within the hollow inner region;

an outer conductive layer deposited on the outer surface; and an inner conductive layer deposited on the inner surface, such that when the outer deposited conductive layer and the inner deposited conductive layer are activated by the applied voltage, the piezoelectric shell resonates to produce an output signal waveform that is transmitted radially outward from the outer surface about the axis of the transducer, wherein one or both of the outer and inner conductive layers contains silver.

31. The ultrasonic transducer of claim 30, wherein the outer deposited conductive layer comprises a silver based compound.

32. The ultrasonic transducer of claim 30, wherein the outer deposited conductive layer comprises a silver based alloy.

33. The ultrasonic transducer of claim 30, wherein the outer deposited conductive layer comprises a mixture of carbon and silver.

34. The ultrasonic transducer of claim 30, wherein the inner conductive layer comprises silver.

35. The ultrasonic transducer of claim 30, wherein the inner deposited conductive layer comprises a silver based compound.

36. The ultrasonic transducer of claim 30, wherein the inner deposited conductive layer comprises a silver based allay.

37. The ultrasonic transducer of claim 30, wherein the inner conductive layer comprises a mixture of carbon and silver.

38. A transducer activatable by an applied voltage, the transducer comprising:

a substantially rectangular formable piezoelectric film having an outer surface, an inner surface, a bottom edge, a top edge opposite the bottom edge, a first side edge, and a second side edge opposite the first side edge;

an outer conductive layer on the outer surface; and an inner conductive layer on the inner surface opposite the outer conductive layer;

the formable piezoelectric film being rollably formed into a continuous piezoelectric shell with a hollow inner region defined from the bottom edge to the top edge, and having a connected overlapping region between the first side edge and the second side edge, the continuous piezoelectric shell having an axis extending from the bottom edge to the top edge within the hollow inner region;

such that when the outer deposited conductive layer and the inner deposited conductive layer are activated by the applied voltage, the formed continuous piezoelectric shell resonates to produce an output signal waveform that is transmitted radially outward from the outer surface about the axis of the transducer.

39. The transducer of claim 38, further comprising:

a spool having a bottom edge having a first circumference and a top edge having a second circumference located within the inner region of the piezoelectric shell, the bottom edge generally aligned with the bottom edge of the piezoelectric shell, and the top edge generally aligned with the top edge of the piezoelectric shell, such that the spool acts to increase the output sound pressure level for the transducer.

40. The transducer of claim 39, further comprising:

means for applying an input signal to the outer conductive layer and the inner conductive layer.

41. The transducer of claim 39, wherein the bottom edge of the piezoelectric shell is attached to bottom edge of the spool.

42. The transducer of claim 39, wherein the top edge of the piezoelectric shell is attached to the top edge of the spool.

43. The transducer of claim 39, wherein the spool further comprises:

a central surface between the bottom edge of the spool and the top edge of the spool having a central circumference less than the first circumference of the bottom edge of the spool and the circumference of the top edge of the spool, such that a substantially uniform air cavity is defined between the central surface of the spool and the inner surface of the piezoelectric shell.

44. The transducer of claim 39, further comprising:

a writing pen having a pointing tip, wherein the pointing up extends through the hollow region of the formed continuous shell of the piezoelectric film.

45. The transducer of claim 39, wherein the formed continuous shell of the piezoelectric film is a cylindrical continuous shell.

46. The transducer of claim 38, wherein the formed continuous shell of the piezoelectric film is a polygonal continuous shell.

47. The transducer of claim 38, further comprising:

a protective coating layer over the outer conductive layer.

48. The transducer of claim 38, further comprising:

a protective coating layer over the inner conductive layer.

49. The transducer of claim 38, wherein the outer conductive layer is silver.

50. The transducer of claim 38, wherein the outer conductive layer is a silver based compound.

51. The transducer of claim 38, wherein the outer conductive layer is a silver based alloy.

52. The transducer of claim 38, wherein the outer conductive layer is a mixture of carbon and silver.

53. The transducer of claim 38, wherein the inner conductive layer is silver.

54. The transducer of claim 38, wherein the inner conductive layer is a silver based compound.

55. The transducer of claim 38, wherein the inner conductive layer is a silver based alloy.

56. The transducer of claim 38, wherein the inner conductive layer is a mixture of carbon and silver.

57. The transducer of claim 38, wherein the piezoelectric shell includes a first lead extension tab and a second lead extension tab on the bottom edge of the piezoelectric shell, wherein the outer conductive layer extends onto the first lead extension tab, and the inner conductive layer extends onto the second lead extension tab.

58. A process for forming a transducer which is activatable by an applied voltage, the process comprising:

depositing an outer conductive layer on a first surface of a generally rectangular piezoelectric film layer having a bottom edge, a top edge, a first side edge and a second side edge;

depositing an inner conductive layer on an opposing second side of the piezoelectric film layer;

rolling the piezoelectric film layer into a piezoelectric shell having an outer surface and a hollow inner region defined therein, wherein the first side edge and the second side edge overlap to form an overlapping region, wherein the outer deposited conductive layer is located on the outer surface, and wherein the inner deposited conductive layer is located within the hollow inner region, the piezoelectric shell having an axis extending from the bottom edge to the top edge within the hollow inner region; and connecting the first side edge and the second side edge within the overlapping region;

such that when the outer deposited conductive layer and the inner deposited conductive layer are activated by the applied voltage, the piezoelectric shell resonates to produce an output signal waveform that is transmitted radially outward from the outer surface about the axis of the piezoelectric shell.

59. The process of claim 58, further comprising the step of:

providing a means for applying an input signal to the outer conductive layer and the inner conductive layer.

60. The process of claim 58, further comprising the step of:

placing a spool having a bottom edge having a first circumference and a top edge having a second circumference located within the inner region of the formed piezoelectric shell, the bottom edge generally aligned with the bottom edge of the piezoelectric shell, and the top edge generally aligned with the top edge of the piezoelectric shell, such that the spool acts to increase the output sound pressure level for the transducer.

61. The process of claim 60, wherein the bottom edge of the formed piezoelectric shell is attached to the bottom edge of the spool.

62. The process of claim 60, wherein the top edge of the formed piezoelectric shell is attached to the top edge of the spool.

63. The process of claim 60, wherein the spool further comprises:

a central surface between the bottom edge and the top edge having a central circumference less than the first circumference of the bottom edge and the circumference of the top edge.

64. The process of claim 58, further comprising the step of:

locating a pointing tip of a writing pen through the hollow region of the formed piezoelectric shell.

65. The process of claim 58, wherein the piezoelectric shell comprises a cylindrical piezoelectric shell.

66. The process of claim 58, wherein the piezoelectric shell comprises a polygonal piezoelectric shell.

67. The process of claim 58, further comprising the step of:

forming a protective coating layer over the outer conductive layer.

68. The process of claim 58, further comprising the step of:

forming a protective coating layer over the inner conductive layer.

69. The process of claim 58, wherein the outer conductive layer is silver.

70. The process of claim 58, wherein the outer conductive layer a silver based compound.

71. The process of claim 58, wherein the outer conductive layer is a silver based alloy.

72. The process of claim 58, wherein the outer conductive layer is a mixture of carbon and silver.

73. The process of claim 58, wherein the inner conductive layer is silver.

74. The process of claim 58, wherein the inner conductive layer is a silver based compound.

75. The process of claim 58, wherein the inner conductive layer is a silver based alloy.

76. The process of claim 58, wherein the inner conductive layer is a mixture of carbon and silver.

77. The process of claim 58, wherein the piezoelectric film includes a first lead extension tab and a second lead extension tab on the bottom edge of the piezoelectric film, wherein the outer conductive layer extends onto the first lead extension tab, and the inner conductive layer extends onto the second lead extension tab.

* * * * *

UNITED STATES PATENT AND TRADEMARK OFFICE
CERTIFICATE OF CORRECTION

PATENT NO. : 6,731,270 B2
DATED : May 4, 2004
INVENTOR(S) : Tosaya

It is certified that error appears in the above-identified patent and that said Letters Patent is hereby corrected as shown below:

Column 12,
Line 66, please delete the number "20".

Column 15,
Line 50, please change "fanned" to -- formed --.

Column 17,
Line 66, please change "allay" to -- alloy --.

Column 18,
Line 60, please change "up" to -- tip --.

Signed and Sealed this

Thirteenth Day of July, 2004

JON W. DUDAS
*Acting Director of the United States Patent and Trademark Office*